United States Patent [19]

Shively

[11] Patent Number: 5,778,105
[45] Date of Patent: Jul. 7, 1998

[54] METHOD OF AND APPARATUS FOR REMOVING ARTIFACTS FROM A REPRODUCTION

[75] Inventor: John Thomas Shively, Hinsdale, Ill.

[73] Assignee: R.R. Donnelley & Sons Company, Chicago, Ill.

[21] Appl. No.: 598,064

[22] Filed: Feb. 7, 1996

Related U.S. Application Data

[63] Continuation of Ser. No. 182,794, Jan. 14, 1994, abandoned.
[51] Int. Cl.[6] .................. G06K 9/40; H04N 1/40
[52] U.S. Cl. .................. 382/269; 382/275; 358/455; 358/456
[58] Field of Search .................. 382/269, 258, 382/275, 266, 168, 174, 199, 201, 202, 272, 273, 254; 345/136, 137; 358/455, 456

[56] References Cited

U.S. PATENT DOCUMENTS

| | | | |
|---|---|---|---|
| 3,668,637 | 6/1972 | Sakai et al. | 382/51 |
| 3,737,855 | 6/1973 | Cutaia | 340/146.3 AG |
| 4,124,870 | 11/1978 | Schatz et al. | 358/260 |
| 4,334,274 | 6/1982 | Agui et al. | 364/515 |
| 4,368,462 | 1/1983 | Crawley | 340/723 |
| 4,703,363 | 10/1987 | Kitamura | 358/284 |
| 4,853,970 | 8/1989 | Ott et al. | 382/54 |
| 5,050,227 | 9/1991 | Furusawa et al. | 382/54 |
| 5,050,229 | 9/1991 | Barski et al. | 382/55 |
| 5,054,102 | 10/1991 | Gaborski | 382/54 |
| 5,058,182 | 10/1991 | Kuan et al. | 382/22 |
| 5,091,973 | 2/1992 | Watanabe | 382/54 |
| 5,093,870 | 3/1992 | Watanabe | 382/47 |
| 5,105,471 | 4/1992 | Yoshida et al. | 382/55 |
| 5,293,579 | 4/1994 | Stockholm | 382/54 |
| 5,301,038 | 4/1994 | Todd | 358/455 |

*Primary Examiner*—Leo Boudreau
*Assistant Examiner*—Bhavesh Mehta
*Attorney, Agent, or Firm*—Marshall, O'Toole, Gerstein, Murray & Borun

[57] ABSTRACT

A method of and system for reducing aliasing effects in a digital reproduction of an original image are disclosed. A first set of pixels extending along a first direction in the digital reproduction and satisfying an edge condition is found and a second set of pixels lying on a first line and extending along the first direction are identified from the first set of pixels and from the sampled values associated with pixels lying in at least one additional line extending along a second direction transverse to the first direction. The sampled values for the pixels lying on the first line are modified toward a first value and the sampled values for pixels defining a second line adjacent the first line are modified toward a second value.

36 Claims, 33 Drawing Sheets

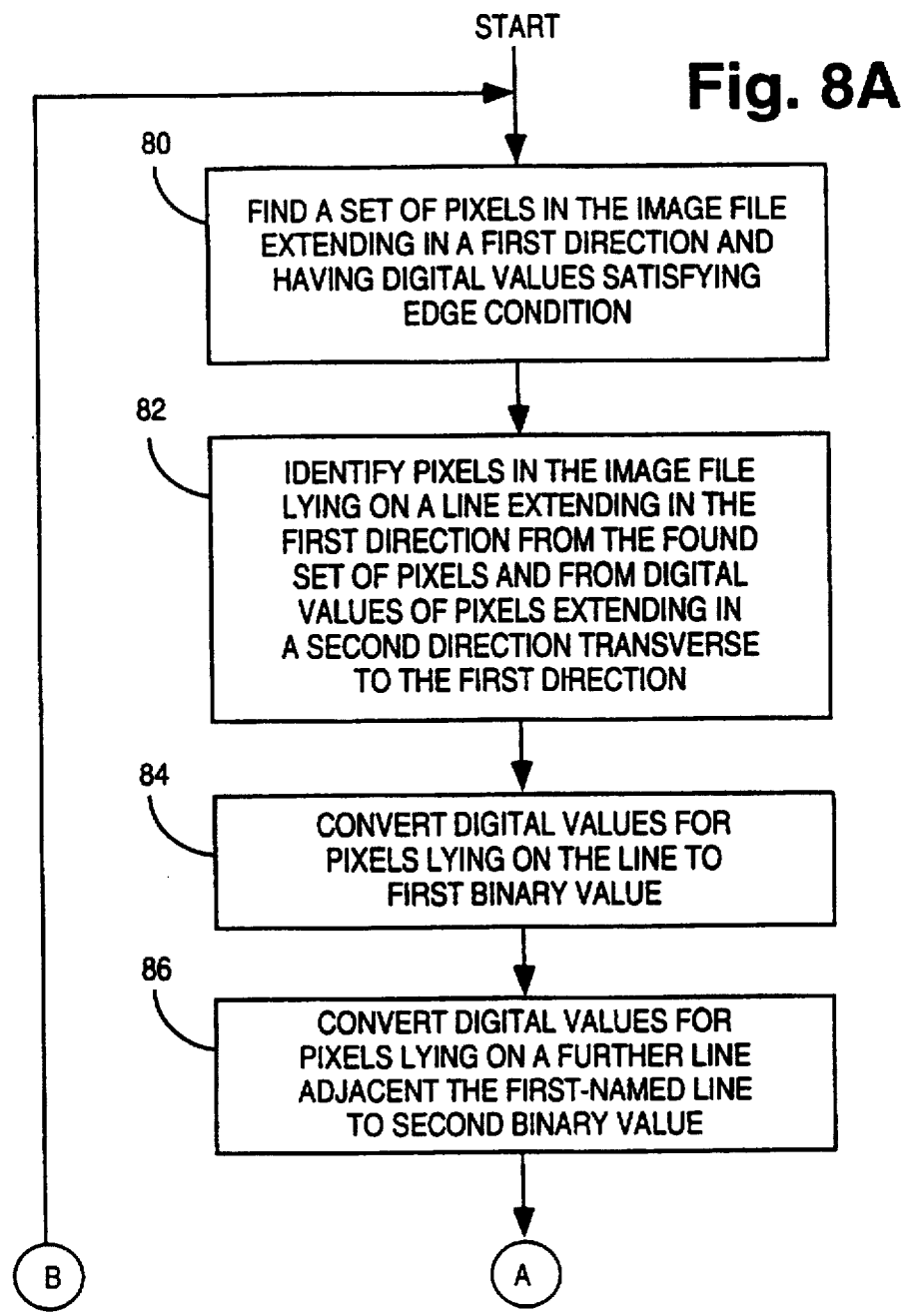

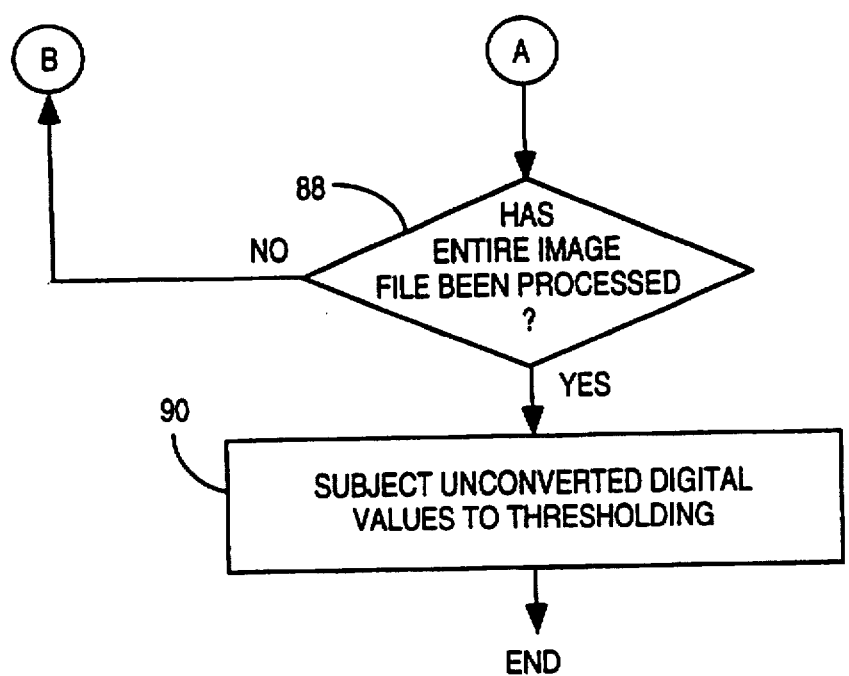

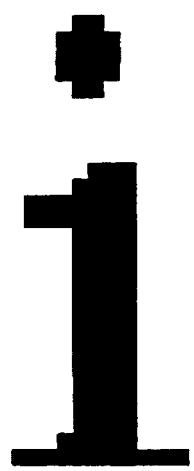
Fig. 9A
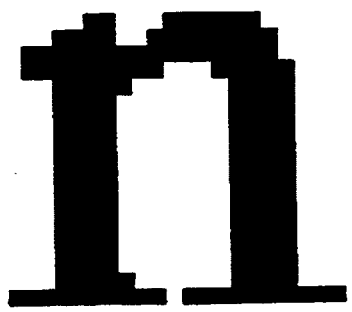
Fig. 9B
Fig. 9C
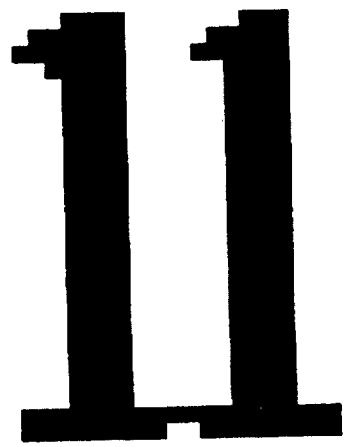

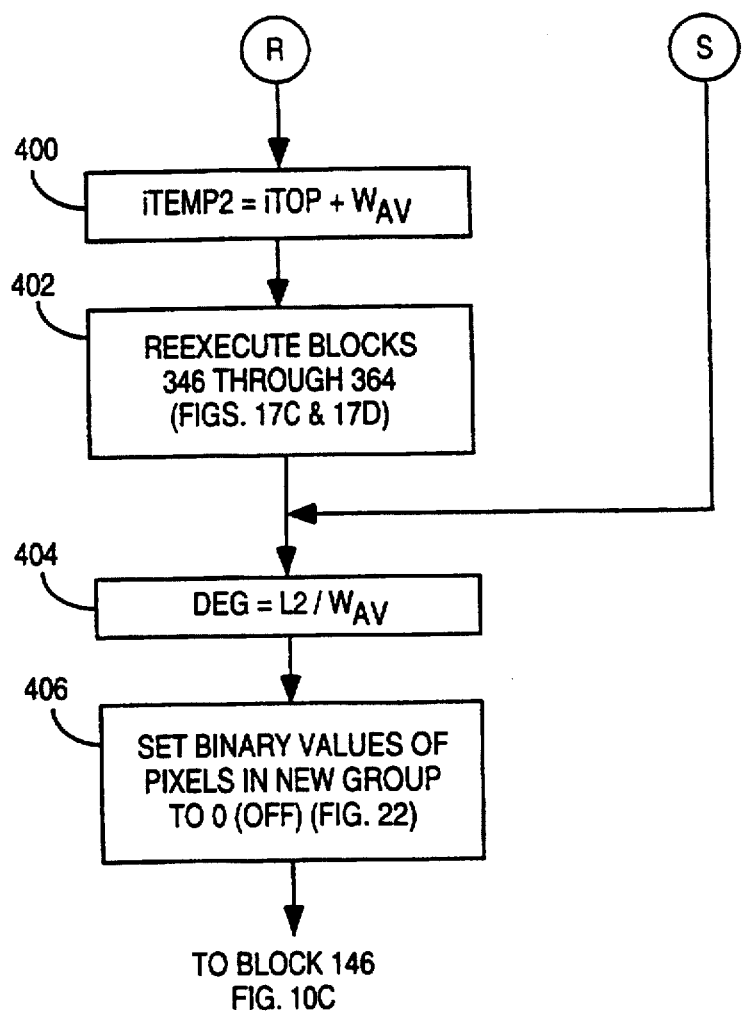

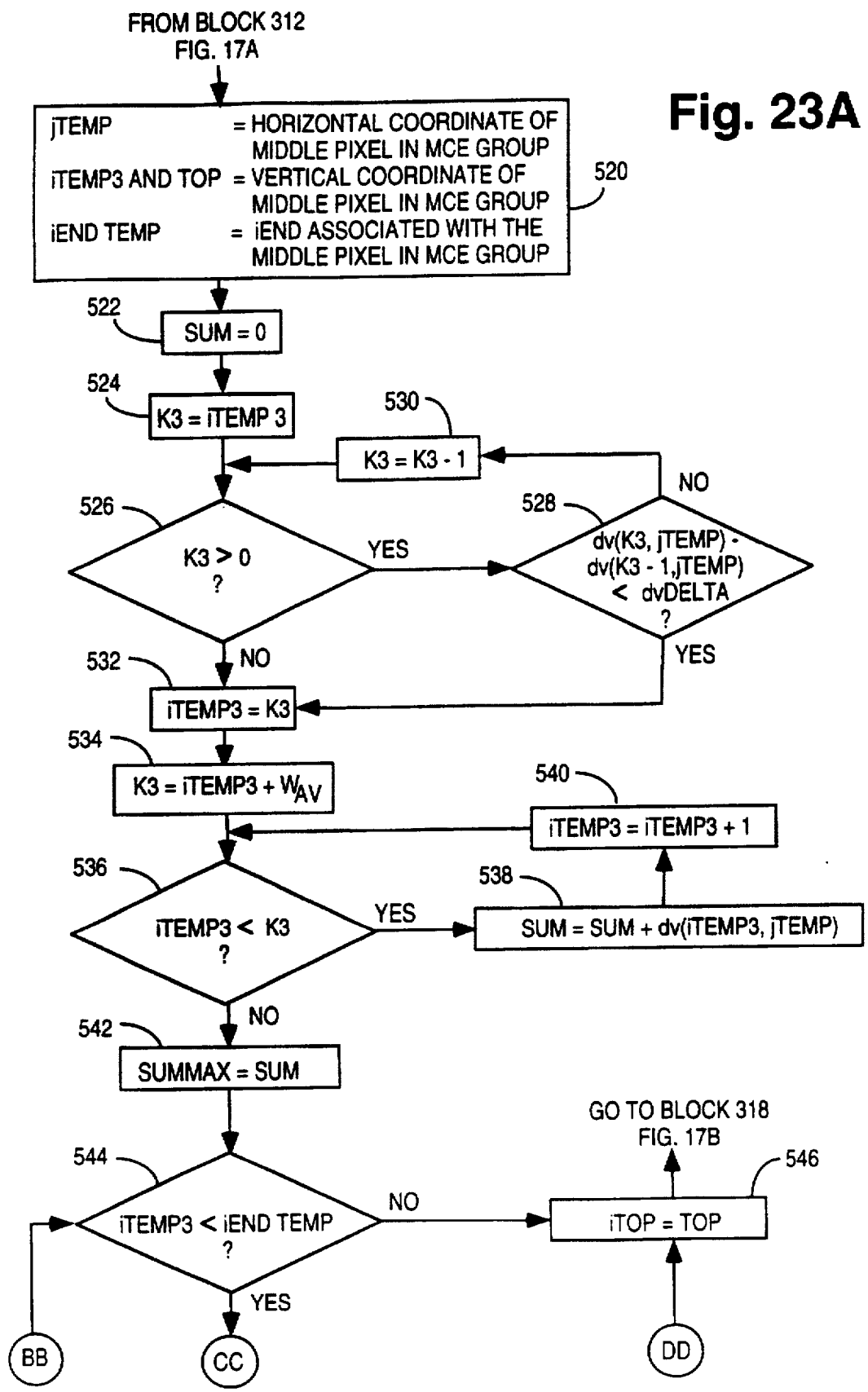

METHOD OF AND APPARATUS FOR REMOVING ARTIFACTS FROM A REPRODUCTION

This is a continuation of U.S. application Ser. No. 08/182,794, filed Jan. 14, 1994, now abandoned.

TECHNICAL FIELD

The present invention relates generally to reproduction techniques and systems, and more particularly to a method of and apparatus for reducing the incidence of artifacts, such as jagged edges or non-uniform strokes, from a reproduction of a scanned original image.

BACKGROUND ART

Often, when it is desired to reproduce an original image, a scanner is used to create an electronic file representing the image. More specifically, the image is broken up into a series of picture elements ("pixels") and a digital value in a range between two limits, for example, 0 and 255, is developed representing an image parameter of each pixel. In many cases, a scanner is used and the resulting digital values represent the percentage of each pixel area covered by colorant. Thereafter, the digital values are converted to zeroes and ones by a thresholding process, i.e., the digital values are compared to an arbitrary threshold of, for example, 128, and a bit value is set to zero for each pixel where the digital value associated with that pixel is less than 128. For each digital value greater than or equal to 128, the bit value for the associated pixel is set equal to one. The output file containing the resulting bit values is used to develop a reproduction of the original image wherein ink or another colorant is applied at pixel locations in the reproduction having an associated bit value of one. No ink or colorant is applied to those pixels in the reproduction having an associated bit value of zero.

Often, a reproduction produced in accordance with the foregoing technique includes artifacts in the form of jagged edges or lines which are particularly noticeable when type is reproduced. Another type of artifact which is developed in such reproduced type comprises the production of strokes of unequal widths wherein such strokes were of the same width in the original image. These artifacts can be readily observable to the naked eye, particularly when strokes of unequal width are proximate to one another, and quite distracting to the reader. These artifacts arise from aliasing effects caused by the coarse quantization of the scanning process. Specifically, the size of the individual pixel elements is not small enough to adequately sample high frequency image components, and hence ambiguities are introduced into the reproduction. While the incidence of these artifacts can be reduced by increasing the sampling frequency, the resultant larger image file must still be processed to produce an image of a resolution consistent with the output device.

Barski, et al., U.S. Pat. No. 5,050,229 discloses a method of and apparatus for thinning alphanumeric characters for optical character recognition. The width of each stroke in a bitmapped character image is reduced one pixel at a time over a series of repetitive cycles until the number of cycles exceeds a predetermined number. As part of the thinning process, it appears that edges are smoothed.

Cutaia, U.S. Pat. No. 3,737,855 discloses a character enhancement system which minimizes undesirable black fill-ins, noise and white voids in character patterns. A determination at each elemental area of an image whether a black or white mark at such area should be left alone or converted to an opposite mark is based upon an examination of surrounding elemental areas using probabilities.

Ott, et al., U.S. Pat. No. 4,853,970 discloses an apparatus for processing digitized images. The apparatus determines for each pixel a bit value indicating whether the pixel is to be black or white in a reconstructed image. The bit value is assigned according to one of two algorithms depending upon whether the pixel is determined to lie within a transition region. If the pixel lies within a transition region, the first algorithm assigns the bit value in dependence upon a determination of which side of a virtual boundary the pixel lies. For pixels not lying in a transition region, the second algorithm assigns the bit value. The second algorithm may comprise any known half-tone or thresholding algorithm.

Schatz, U.S. Pat. No. 4,124,870 discloses a method of enhancing the print quality of coarsely scanned characters. Edges are found by detecting intermediate pixel values between white and black levels. The coarsely scanned characters are converted into data utilized by a fine level reproducer to permit high quality reproduction of the characters.

Watanabe, U.S. Pat. No. 5,093,870 discloses a smoothing method for smoothing a contour of a character wherein contours in existing bitmaps are detected and first and second smoothing processes are used to smooth the character outlines. A known rectilinear interpolation process is then used to further smooth the character pattern obtained by the second smoothing process.

Watanabe, U.S. Pat. No. 5,091,973 discloses an image processing apparatus for smoothing contours. Contour dots of an original image pattern are detected and such dots are converted to intermediate brightness portions between a white and a black level.

Kitamura, U.S. Pat. No. 4,703,363 discloses an apparatus for smoothing jagged borderlines wherein edge pixels are detected and are assigned intermediate pixel values between white and black values.

Crawley, U.S. Pat. No. 4,368,462 discloses an apparatus and method for providing a digital representation of graphic information on a document. Subarrays are passed to a lookup table, which in turn develops output data having smoothed edges.

Agui, et al., U.S. Pat. No. 4,334,274 discloses a method of determining whether a region in a picture is within a closed boundary.

SUMMARY OF THE INVENTION

In accordance with the present invention, artifacts which would otherwise be created in a reproduction are removed so that the quality of the reproduction is enhanced.

More particularly, according to one aspect of the present invention, a method of reducing aliasing effects in a digital reproduction of an original image wherein the digital reproduction is divided into a two-dimensional array of pixels each having a sampled value associated therewith includes the steps of finding a first set of pixels extending along a first direction in the reproduction and satisfying an edge condition and identifying a second set of pixels lying on a first line extending along the first direction in the reproduction from the first set of pixels and from sampled values associated with pixels lying on at least one additional line extending along a second direction transverse to the first direction. The sampled values for the pixels lying on the first line are modified toward a first value and the sampled values for pixels defining a second line adjacent the first line are modified toward a second value.

Preferably, the step of finding includes the step of detecting where a threshold number of contiguous pixels extending along the first direction satisfy the edge condition. Also preferably, the step of detecting includes the steps of comparing the sampled values of an initial pixel pair including a first pixel and a second pixel adjacent thereto lying on a first additional line extending along the second direction to determine if a first edge criterion is met, comparing the sampled values of pixels of further pixel pairs lying on successive additional lines parallel to the first additional line if the first edge criterion is met to determine the number of further pixel pairs that satisfy a second edge criterion and concluding that an edge has been found if the number of further pixel pairs that satisfy the second edge criterion exceeds a certain value.

According to a specific aspect of the present invention, the step of finding preferably includes the step of determining the dimension of a stroke along the second direction from the first set of pixels and other pixels associated therewith. The step of identifying may comprise the step of ascertaining the second set of pixels in dependence upon the first set of pixels and the determined stroke dimension.

According to yet another specific aspect of the present invention, the step of determining includes the steps of finding the dimension of a stroke portion associated with each pixel of the first set and deriving the dimension of the stroke from the dimensions of the stroke portions. Preferably, the step of deriving includes the step of finding the most common stroke portion dimension associated with the pixels of the first set and assigning the most common stroke portion dimension as the stroke dimension. Still further, the step of finding the dimension of each stroke portion preferably includes the steps of summing the sampled values of pixels lying in the stroke portion together to obtain a sum and dividing the sum by one of first and second limits.

In accordance with yet another specific aspect, the dimension of the stroke is expressed as a variable W equal to a number of pixels and the step of identifying includes the steps of selecting one of the pixels of the first set, selecting a certain set of W contiguous pixels within the stroke portion associated with the selected pixel in accordance with a selection criterion and establishing the first line coincident with a pixel of the certain set. Further in accordance with this specific aspect of the present invention, the step of selecting the certain set of W contiguous pixels preferably includes the step of finding the W contiguous pixels in the stroke portion having the greatest sum of sampled values.

In accordance with yet another aspect of the present invention, a method of modifying an image having a plurality of pixels each of which has a sampled value associated therewith wherein the sampled values are in a range between first and second limits includes the steps of finding pixels in the image defining an edge extending along a first direction, determining from the found pixels the dimension of the stroke along a second direction transverse to the first direction and identifying a set of contiguous pixels defining a first line extending along the first direction in dependence upon the found pixels and the determined stroke dimension. The sampled values for the pixels in the identified set are modified toward the first limit while the sampled values for pixels defining a second line adjacent the first line are modified toward the second limit.

In accordance with a still further aspect of the present invention, a method of smoothing jagged edges in an image having a plurality of pixels each of which has a sampled value associated therewith wherein the sampled values are in a range between first and second limits includes the steps of finding a first set of pixels extending in a first direction in the image satisfying an edge condition and identifying a second set of pixels in the image which, together with the first set of pixels, define a stroke. Associated with each pixel of the first set is a pixel of the second set located on a line extending in a second direction perpendicular to the first direction. For each pixel of the first set, the sampled value thereof is added to the sampled value of the pixel of the second set associated therewith and the sampled values of all pixels located therebetween to obtain a plurality of sums. Each sum is divided by one of the first and second limits to obtain a plurality of stroke run lengths each associated with one of the pixels of the first set. The most common of the stroke run lengths and the pixels of the first set associated with such run lengths are found and first and second lines extending in the first direction are defined based upon the pixels of the first set associated with the most common of the stroke run lengths. Pixels lying on the first and second lines are modified toward the first limit while pixels lying on third and fourth lines adjacent the first and second lines, respectively, are modified toward the second limit.

In accordance with yet another aspect of the present invention, a system for reducing aliasing effects in a digital reproduction of an original image wherein the digital reproduction is divided into a two-dimensional array of pixels and wherein each pixel has a sampled value associated therewith includes means for finding a first set of pixels extending along a first direction in the digital reproduction and satisfying an edge condition and means coupled to the finding means for identifying a second set of pixels lying on a first line extending along the first direction in the digital reproduction from the first set of pixels and from sampled values associated with pixels lying on at least one additional line extending along a second direction transverse to the first direction. Means are coupled to the identifying means for modifying the sampled values for the pixels lying on the first line toward a first value and for modifying the sampled values for pixels defining a second line adjacent the first line toward a second value.

In accordance with a still further aspect of the present invention, a system for modifying an image having a plurality of pixels each of which has a sampled value associated therewith includes means for finding a first set of pixels in the image extending along a first direction and satisfying an edge condition and means coupled to the finding means for determining from the first set of pixels the dimensions of a stroke along a second direction transverse to the first direction. Means are coupled to the finding means and the determining means for identifying a set of contiguous pixels defining a first line extending along the first direction in dependence upon the first set of pixels and the determined stroke dimension. Means are coupled to the identifying means for modifying the sampled values for the pixels in the identified set toward a first value and the sampled values for pixels defining a second line adjacent to the first line toward a second value.

The method and system of the present invention reduce the incidence of artifacts in a reproduction of a scanned original image, thereby leading to a desirable increase in reproduction quality.

BRIEF DESCRIPTION OF THE DRAWINGS

FIGS. 8A and 8B, when joined at the similarly lettered lines, together comprise a generalized flowchart illustrating the steps undertaken by the method of the present invention;

FIGS. 9A-9C are sample reproductions of the images of FIGS. 7A-7C, respectively, produced by the method of the present invention; and FIGS. 10A-10C, 11, 12, 13, 14A-14C, 15, 16, 17A-17G, 18A, 18B, 19, 20A, 20B, 21, 22, 23A and 23B, when joined along the similarly lettered lines, together comprise flowcharts illustrating programming executed by the computer 26 of FIG. 1 to implement the method of the present invention.

DESCRIPTION OF THE PREFERRED EMBODIMENTS

Figure 1:
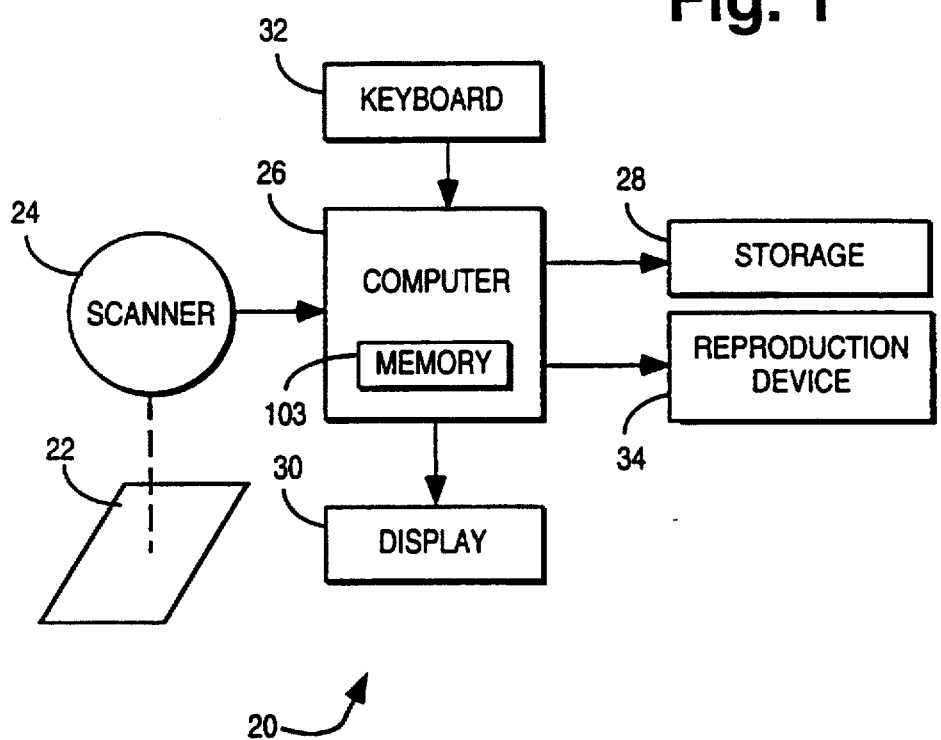
FIG. 1 comprises a block diagram of a system for creating an electronic reproduction of an original image.

Referring now to FIG. 1, a system 20 for producing an electronic image file representing an original image appearing on an image medium 22 includes a scanner 24 which detects an image parameter at each of a plurality of image picture elements or "pixels." The scanner 24 measures the percentage of each pixel area that is covered by ink or another colorant. If desired, a different sensing device which measures an image parameter indicative of pixel percent coverage of colorant may be used. Because the present invention finds particular utility in the reduction of artifacts in monochrome type (i.e., black or another color type on paper), it will be assumed hereinafter that a single digital value ("dv") representing percent coverage is developed for each pixel by the scanner 24. It should be noted that use of the terms "digital value" or "dv" is not limiting in the sense that such terms apply only to values which are digital in nature, but should be interpreted to encompass one or more sampled values of any type, whether analog or digital.

The dv's are supplied to a computer 26 which may assemble the dv's into an input image file which may be stored at a storage unit 28. If desired, the image file may be displayed on a monitor or other display 30 and suitable modifications to the image file may be effected, if desired, by an operator using a interface in the form of a keyboard 32. If desired, other input/output devices might alternatively or additionally be used.

The input image file comprising a plurality of dv's is converted into an output image file comprising a series of binary values of zero or one. A zero associated with a particular pixel in the output file indicates, for example, that no ink or other colorant is to be applied to a reproduction medium at a corresponding pixel location thereon whereas a one indicates that colorant is to be applied to the reproduction medium at such pixel location. If desired, the computer 26 may additionally control a reproduction device 34 to prepare a reproduction of the input image. However, it is more likely that a different controller would be used to control the reproduction device 34. The reproduction may be made on any suitable medium using any suitable colorant(s), such as ink or toner on paper, dyes on film, or the like.

Figure 2:
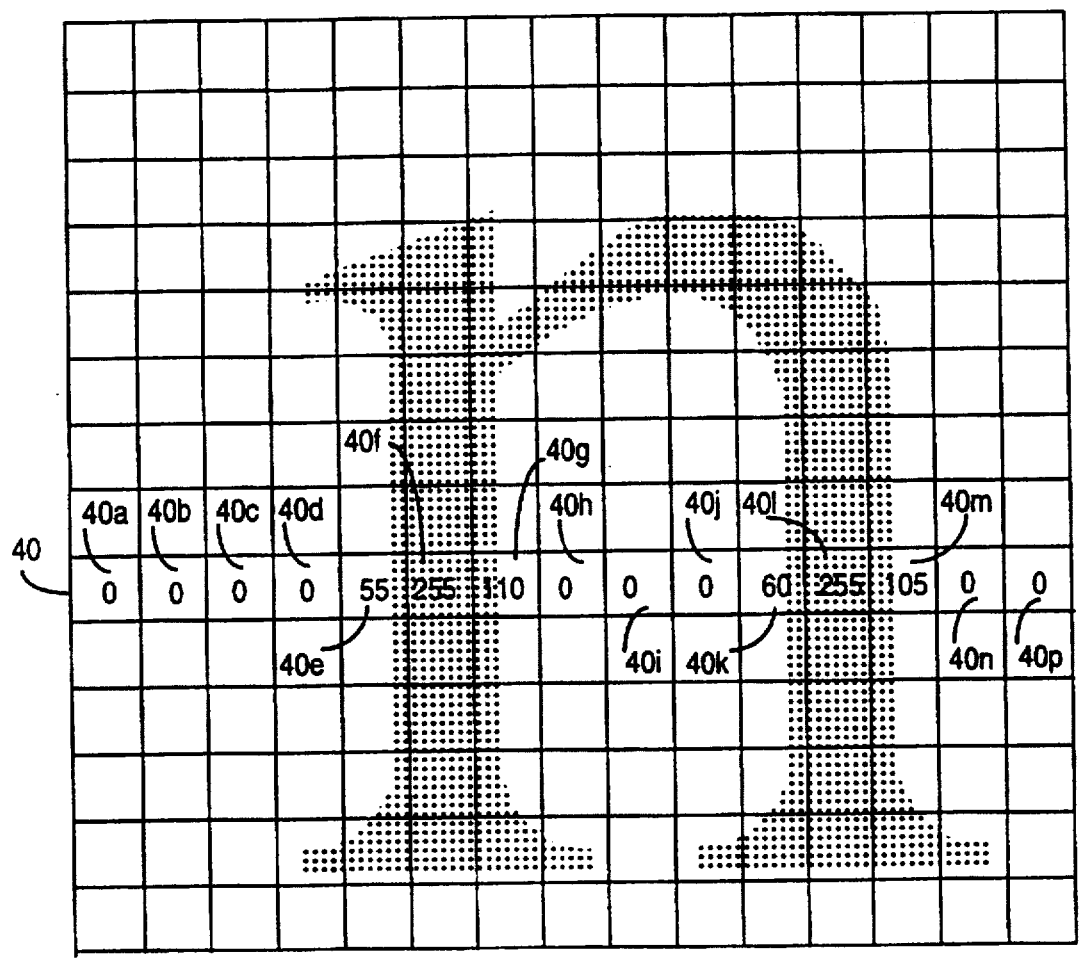
FIG. 2 comprises a reproduction of the letter "n" with a sample pixel grid superimposed thereon.

FIG. 2 comprises an illustration of a letter "n" together with a very coarse pixellization grid illustrating the manner in which digital values are developed. Scanning of the image proceeds in a particular sequence, for example, left-to-right and top-to-bottom. Designated in grid cells of a row 40 are values indicating the dv's obtained by scanning corresponding pixels of the image. Cells 40a–40d, 40h–40j, 40n and 40p have digital values of zero owing to the absence of type in corresponding pixels. Cells 40f and 40l have digital values of 255 owing to the presence of type covering the entire pixels corresponding thereto. Cells 40e, 40g, 40k and 40m have digital values between 0 and 255 owing to the presence of type within a portion of each corresponding pixel.

While the pixellization grid of FIG. 2 is shown as being quite coarse, in reality, the pixel sizes will be reduced relative to the type size as compared to those shown in FIG. 2 so that an acceptable sampling rate or frequency is obtained. For example, for typical 10 point type, each stroke may be four or five pixels wide at a resolution of 300 dots per inch (d.p.i.).

Figures 3, 4:
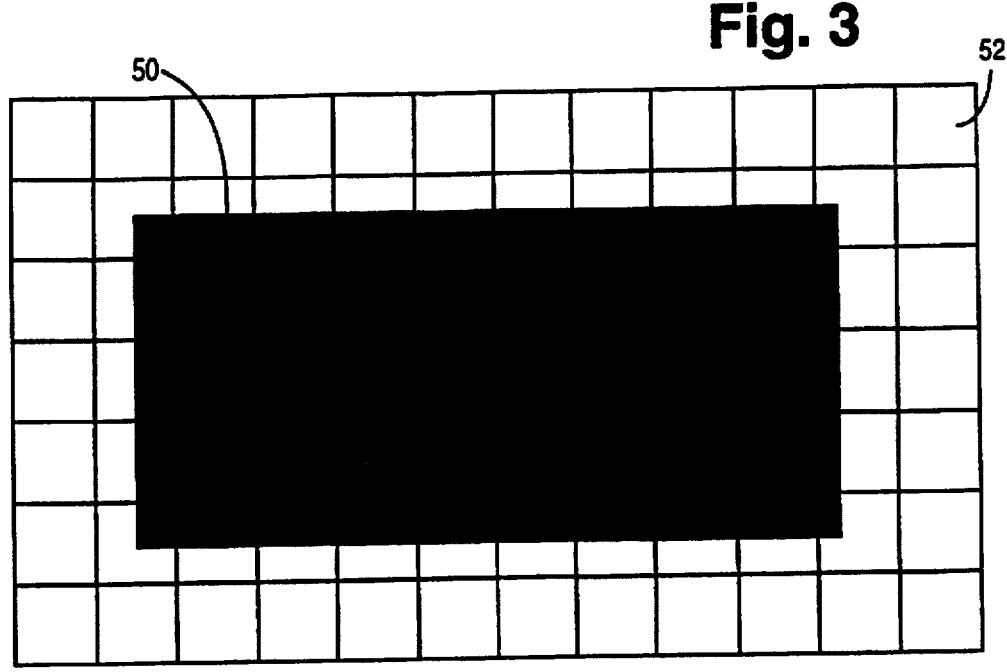
FIG. 3 comprises a reproduction of a dash with a sample pixel grid superimposed thereon.
FIG. 4 comprises a chart illustrating the digital values obtained by scanning the image of FIG. 3 with a scanner wherein the digital values are placed within corresponding cells of the grid of FIG. 3.
Figure 5:
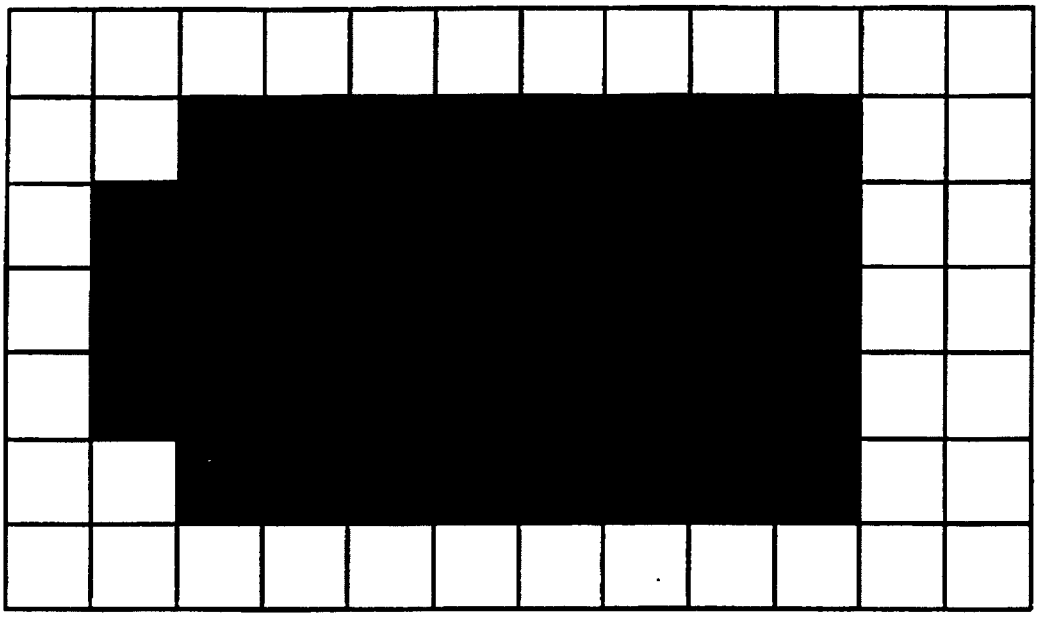
FIGS. 5 and 6 are reproductions of the image of FIG. 3 utilizing a prior art thresholding technique utilizing different thresholds.
Figure 6:
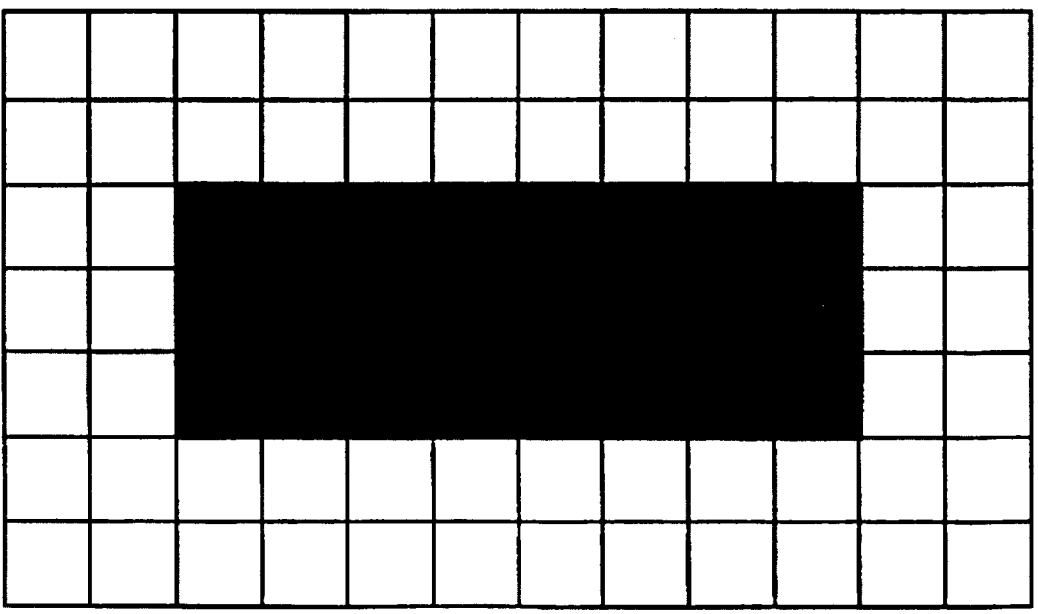

FIG. 3 illustrates an image comprising a rectangular bar 50 which may comprise, for example, a dash in a line of text. Also shown is a pixellization grid 52. FIG. 4 illustrates the pixellization grid 52 of FIG. 3 with digital values resulting from scanning shown within the cells of the grid. When the dv's are compared to a threshold of, for example, 127 in a standard thresholding technique, the reproduction shown in FIG. 5 results. In this case, the rectangular image of FIG. 3 is converted into an image having a nonrectangular shape of greater width and height as compared to the original image. FIG. 6 illustrates the resulting reproduced image when a conventional thresholding technique is used with a threshold of 129. The resulting reproduction is rectangular in shape, although it is shorter and narrower then the original image and shifted in position.

As the foregoing discussion demonstrates, a conventional thresholding technique produces artifacts due to the inability to adequately sample high frequency image components. Also, the choice of threshold value in a conventional thresholding process has a significant effect on the resulting reproduction wherein image shapes may be changed, modified in size and shifted in position.

Figure 7A:
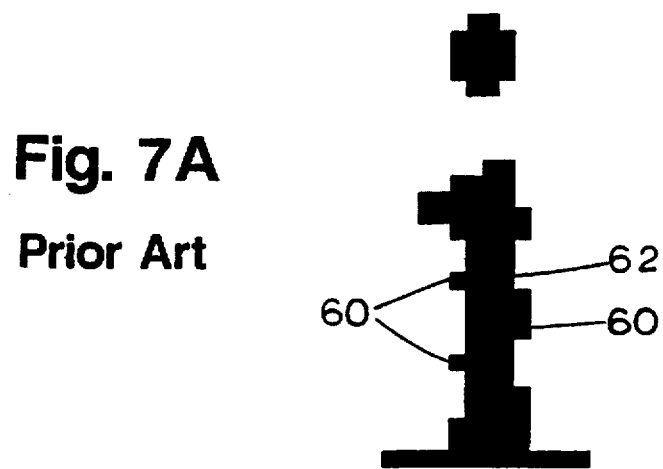
FIGS. 7A-7C are sample reproductions of original images produced by a prior art thresholding technique.
Figure 7B:
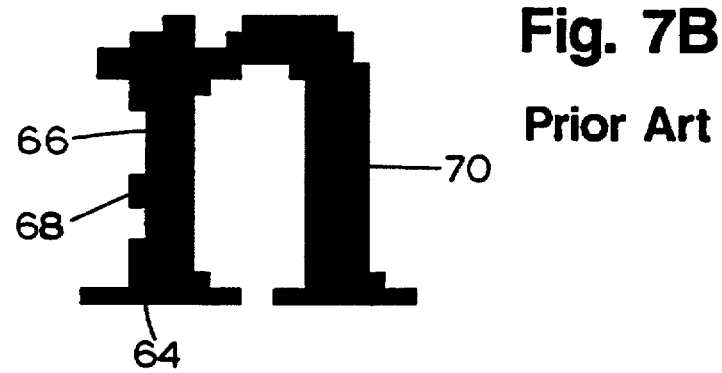

The creation of artifacts in the reproduction can be particularly bothersome to an observer of the reproduction. For example, as seen in FIG. 7A, a reproduction of a letter "i" produced by scanning an original image and subjecting the resulting dv file to a standard thresholding process can create particularly noticeable artifacts in the form of bumps or projections 60 together with a thinned central portion 62 caused by voids between the projections 60. A similar situation is illustrated in FIG. 7B wherein a first leg 64 of a letter "n" has a thinned central portion 66 and a projection 68. In this case, the first leg 64 also appears to an observer to have a thinner stroke weight than a second leg 70.

Figure 7C:
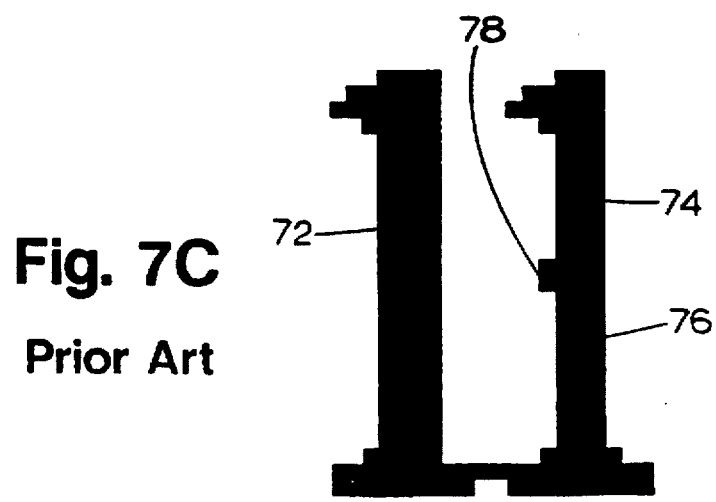

Yet another example of artifact creation is illustrated in FIG. 7C wherein side-by-side "1's" are reproduced using a standard thresholding process. In this case, while the first letter 72 is reproduced accurately, the second letter 74 has a thinned main portion 76 and a projection 78.

By changing the threshold, one can change and perhaps reduce the incidence of artifacts and thus improve the reproduction. However, in the great majority of cases, it will not be possible to reproduce characters without artifacts therein using a standard thresholding process.

In accordance with the present invention, an input image file containing digital values representing magnitudes of an image parameter for associated pixels determines binary values for pixels lying on edges in the reproduction so that edges are smoothed and stroke weights are maintained. More particularly, FIGS. 8A and 8B together illustrate in general terms the method of the present invention. Beginning at a block 80, a set of pixels in the input image file extending in a first direction, for example, horizontal or vertical, and having dv's satisfying an edge condition. In the present method, pixels having a dv of zero are white while pixels having high dv's (e.g., 255) are black, although the reverse convention can instead be used, provided suitable modifications to the programming are implemented as would be evident to one of ordinary skill in the art. A block 82 uses the found set of pixels as well as dv's of pixels extending in a second direction transverse to, and preferably perpendicular to, the first direction to identify pixels in the image lying on a line extending in the first direction. This line may or may not be coincident with a line defined by the found set of pixels. Digital values for pixels lying on the line identified by the block 82 are converted to a first binary value while digital values for pixels lying on a further line adjacent the first line are converted to a second binary value by blocks 84 and 86. A block 88, FIG. 8B, checks to determine whether the entire image file has been processed. If not, control returns to the block 80 of FIG. 8A where a new set of pixels satisfying the edge condition is found. On the other hand, if the entire image file has been processed, control passes to a block 90 wherein unconverted digital values are converted to binary values by a thresholding process. Following the block 90, the process terminates.

FIGS. 9A–9C illustrate actual reproductions of the same letters reproduced in FIGS. 7A–7C using the method of the present invention. As seen in FIGS. 9A–9C, the distracting artifacts have been removed and the stroke weights of the legs of the "n" have been rendered consistent, as have the stroke weights of the main portions of the side-by-side "1's" of FIG. 9C.

Figure 10A:
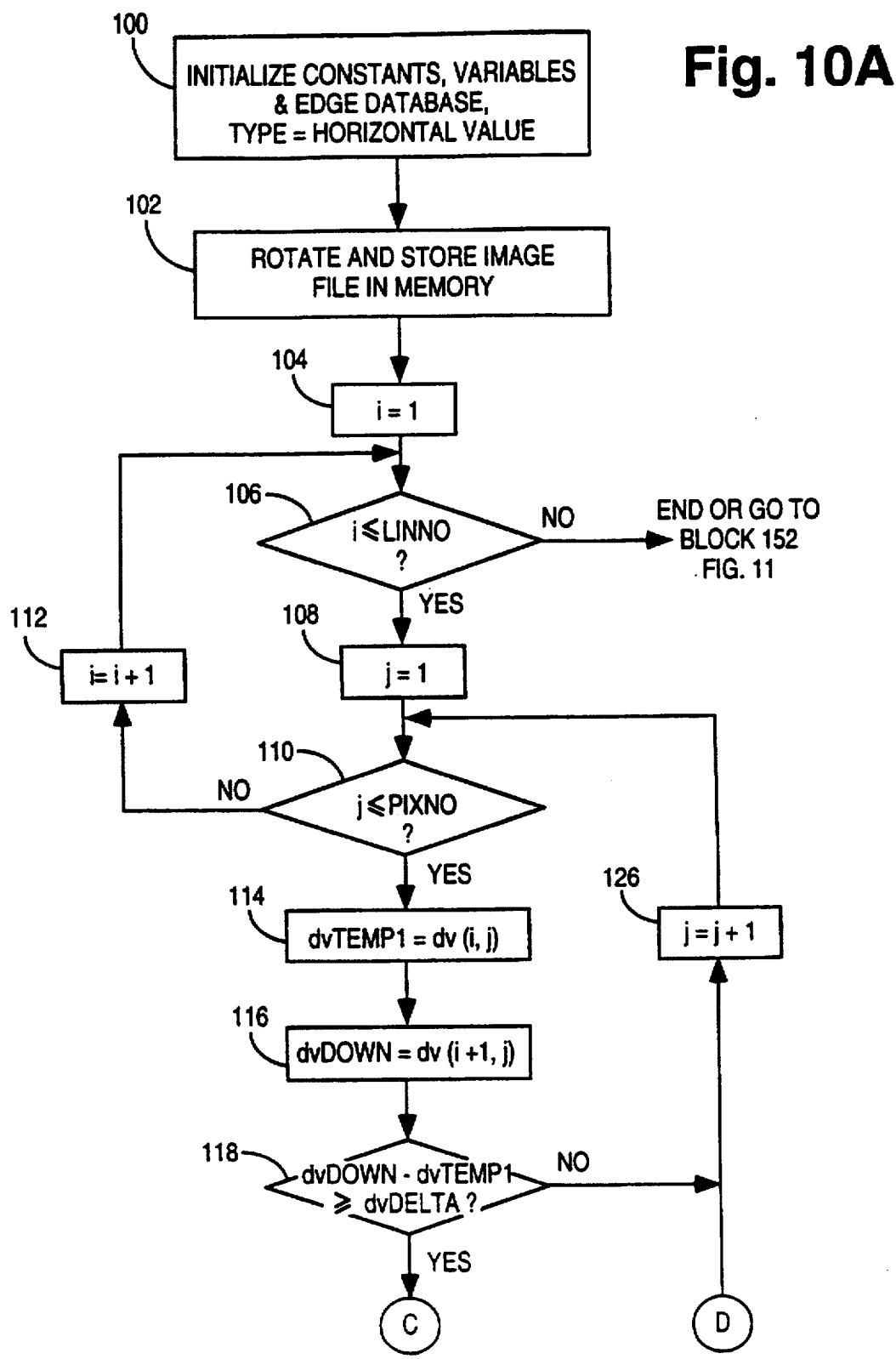
Figure 10B:
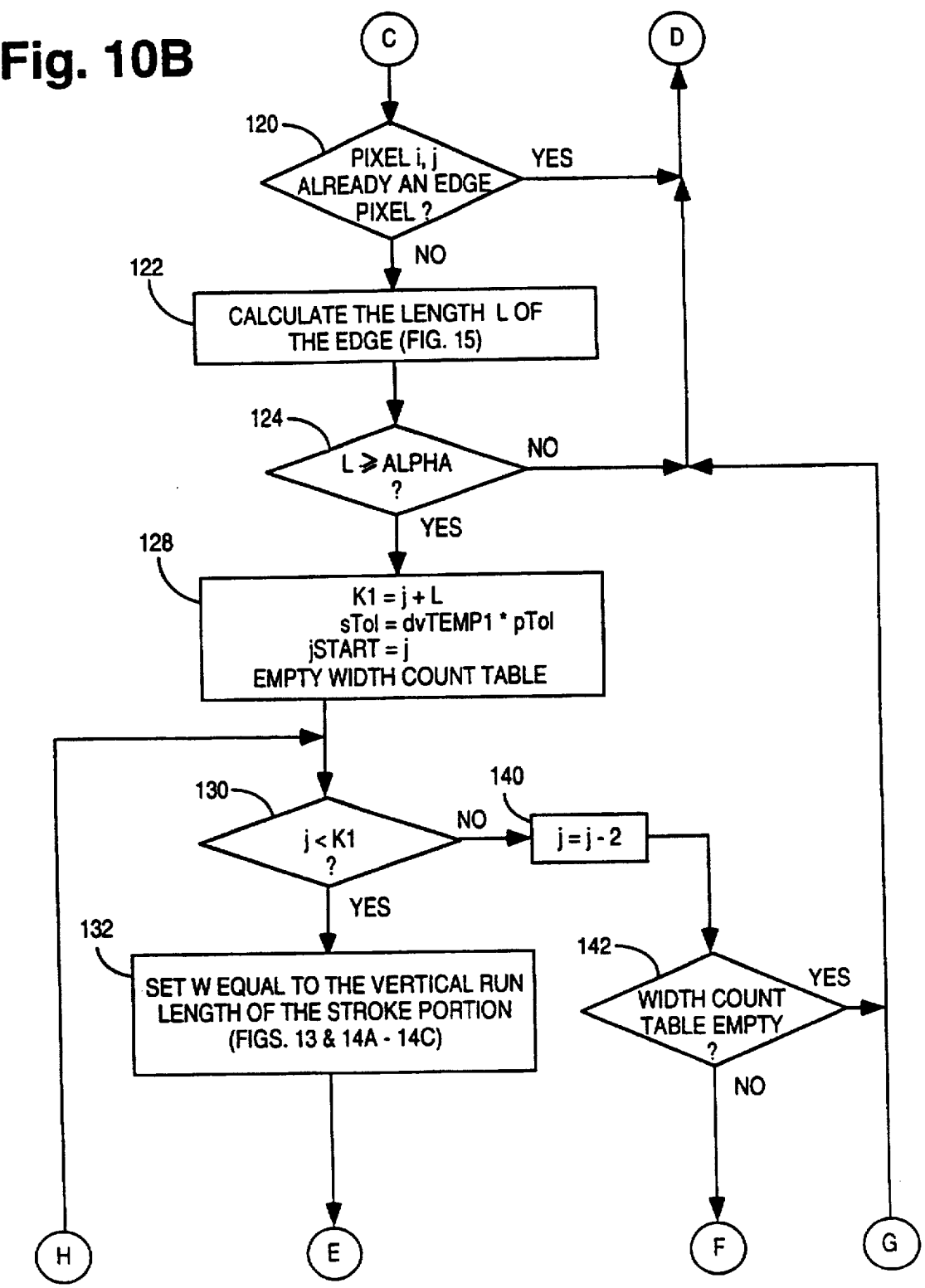
Figure 10C:
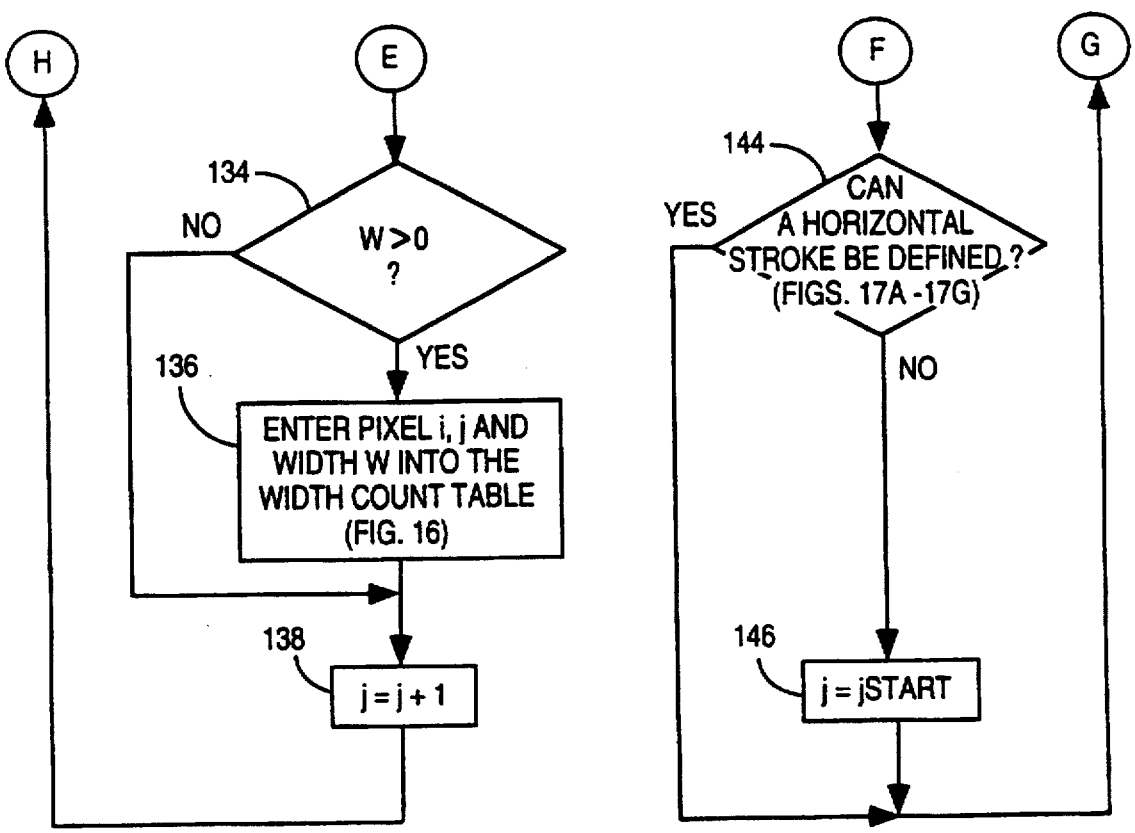

FIGS. 10A–10C together comprise a flowchart of programming executed by the computer 26 to implement the method of the present invention. The programming begins at a block 100 which initializes various constants and variables and clears an edge database of all values. In addition, a variable TYPE is set equal to a digital value indicating that horizontal edges are to be detected. Following a block 100, a block 102 rotates the image file developed by the scanner 24 90° counterclockwise and stores the image file in an internal memory 103 of the computer 26 (FIG. 1) while a block 104 sets the value of a variable i equal to one. The variable i indicates the vertical coordinate of a particular pixel in the rotated image file.

Following the block 104, a block 106 checks to determine whether the value of the variable i is less than or equal to a value LINNO which represents the number of lines of text in the image file. The number of lines in the image file may be manually entered by an operator using the keyboard 32 or may be automatically detected or may be stored together with the image file in the memory 103.

A block 108 then sets the value of a variable j equal to one. The variable j represents the horizontal coordinate or offset of each particular pixel of the rotated image file. A block 110 checks to determine whether the value of the variable j is less than or equal to a value PIXNO representing the number of pixels in each line. The value PIXNO, like the value LINNO, may be entered by an operator or automatically detected or supplied together with the image file in the memory 103. If the value of the variable j is not less than or equal to PIXNO, indicating that an end of a line condition has been reached at a right-hand edge of the rotated image file, a block 112 increments the value of the variable i so that the next line of pixels in the image file is selected. The block 106 then checks to determine whether the new value of the variable i is less than or equal to LINNO and the block 108 resets the value of the variable j to one. Control remains with the blocks 106–112 until all of the pixels of the image file are processed, at which point a determination is made by the block 106 that the variable i is not less than or equal to the value LINNO. At this point, processing is terminated or, optionally, control passes to a block 152, FIG. 11, for further processing.

Figure 15:
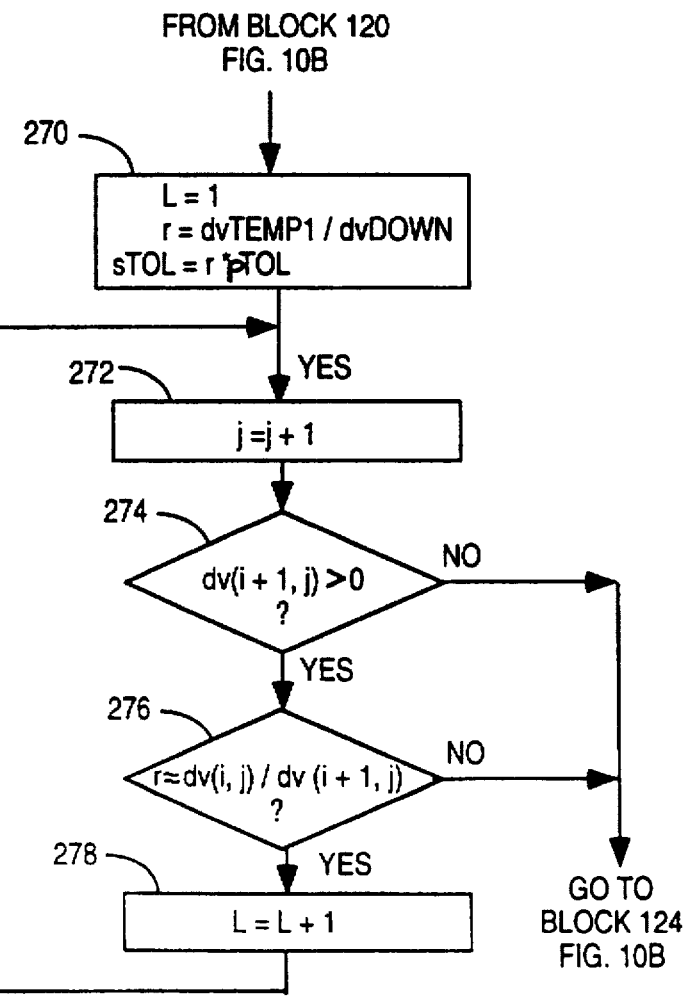

If the block 110 detects that the variable j is less than or equal to the value PIXNO, a block 114 sets a variable dvTEMP1 equal to the digital value stored in the image file at the current pixel position i, j. A block 116 then sets a variable dvDOWN equal to the digital value stored in the image memory at the pixel position i+1, j which is next below the pixel position at the coordinates i, J. Thereafter, block 118 checks to determine whether the difference between the variables dvDOWN and dvTEMP1 is greater than or equal to a value dvDELTA. The block 118 thus determines whether an edge condition is satisfied, i.e., whether a first pixel at the coordinates i, j and a pixel immediately below the first pixel in the rotated image file have at least a predetermined difference dvDELTA between the digital values thereof. If at least this predetermined difference is found by the block 118, a block 120, FIG. 10B, checks to determine whether the pixel at the coordinates i, j has already been determined to lie on an edge. As noted in greater detail hereinafter, as pixels are found to lie on an edge, entries in the edge database are updated indicating that the pixels are on the edge. It is this edge database which is checked by the block 120 to determine whether the pixel at the coordinates i, j has already been entered therein. If not, control passes to a block 122 which determines the length l of the edge containing the pixel at the coordinates i, j. This routine is illustrated in further detail and is described in connection with FIG. 15 herein.

Following the block 122, a block 124 checks to determine whether the length l of the edge is greater than or equal to a variable α representing a minimum edge length which must be detected before the edge will be further evaluated to determine if it is part of a stroke. If the block 124 determines that the length l is not greater to or equal to α, or if the block 118 does not detect that the edge condition has been satisfied, or if the block 120 determines that the pixel at the coordinates i, j has already been entered into the edge database, control passes to a block 126 which increments the value of j and control returns to the block 110 so that the next pixel in the image file is tested to determine whether it satisfies the edge condition.

Once the block 124 detects that the length l of a detected edge is greater than the value α, control passes to a block 128 which sets a variable K1 equal to the sum of the variables j and l. In addition, a variable sTOL is set equal to the product of the variable dvTEMP and a constant pTOL which, in the preferred embodiment is equal to 10%. The variable sTOL is utilized to determine whether two values are approximately equal, as noted in greater detail hereinafter. In addition to the foregoing, a variable jSTART is set equal to the current value of j and a width count table or database which is maintained in the internal memory of the computer 26 is emptied. The width count table is repetitively updated and contains groups of table entries wherein each entry represents a pixel which has determined to lie on an edge as detected by the blocks 118, 122 and 124 and wherein the pixels of a particular group are all associated with a stroke dimension of a particular width. This stroke dimension, measured transversely to the extent of the edge, and preferably perpendicular to the edge, is measured in whole or fractional values of pixels. Thus, for example, the width count table might include a group of five entries representing pixels lying on an edge each having an associated stroke width of 2.0 pixels, a further group of ten entries representing pixels each lying on the same edge and having an associated stroke width of 6.3 pixels, etc.

Figure 16:
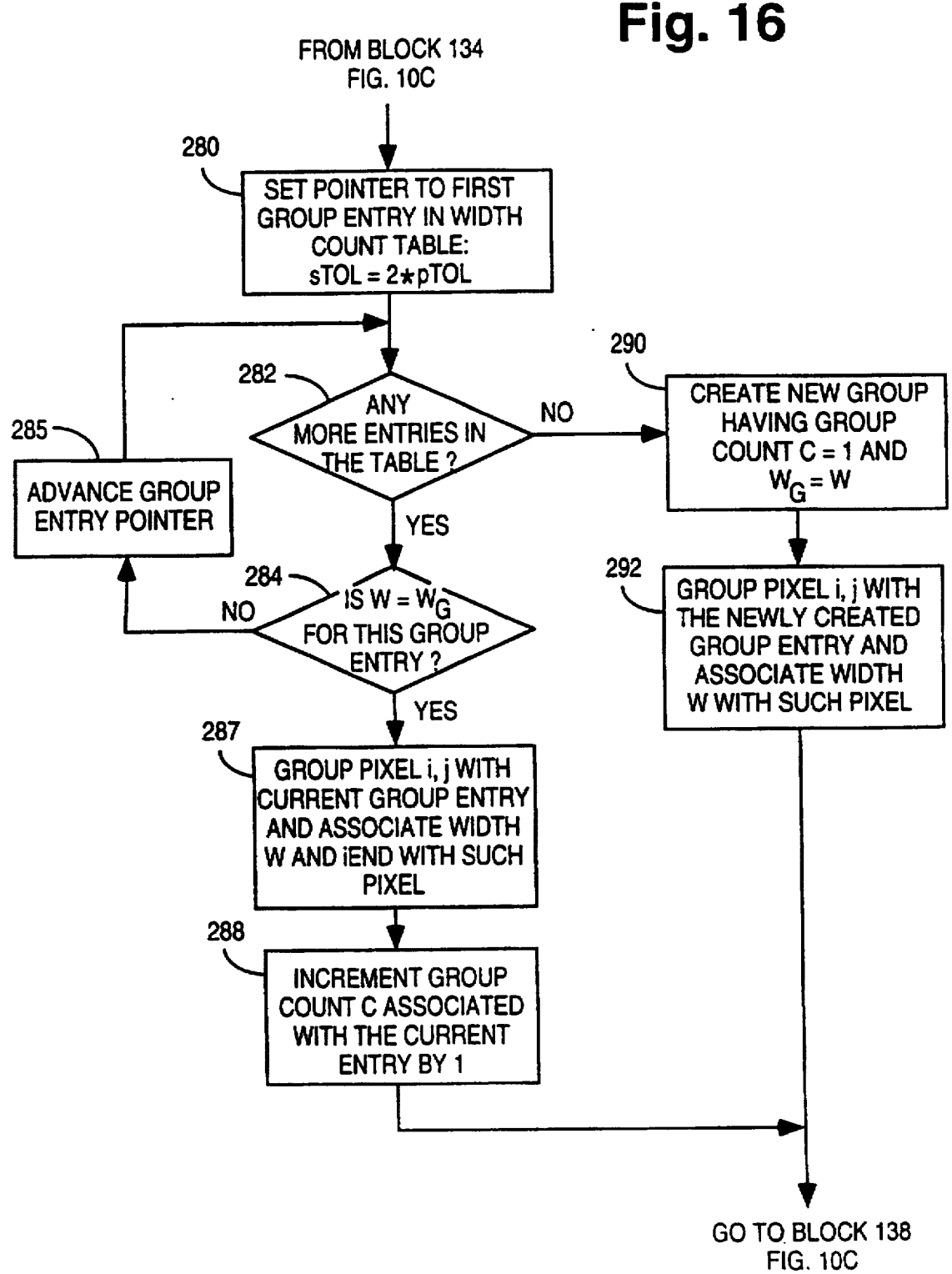

Following the block 128, a block 130 checks to determine whether the current value of the variable j is less than K1. During a first pass through this portion of the program and where the length l of the edge is greater than zero, the current value of the variable j is less than K1. Hence, control passes to a block 132 which sets a variable W equal to the vertical dimension or width of a stroke portion associated with the pixel at the coordinates represented by the current values of i and j. The programming for implementing the function of the block 132 is shown in FIGS. 13 and 14A–14C and is described in greater detail hereinafter. A block 134, FIG. 10C, then checks to determine whether the value of the variable W is greater than zero and, if so, the pixel at the coordinates i, j and the width W associated therewith are entered into the width count table by a block 136. The programming for the block 136 is represented by the flowchart of FIG. 16 and is described in greater detail hereinbelow. Following the block 136, or if the block 134 determines that the value of the variable W is not greater than zero, a block 138 increments j by one and control returns to the block 130, FIG. 10B.

If the block 130 determines that the value of the variable j is not less than the value of the variable K1, control passes to a block 140 where the value of the variable j is decremented by two. A block 142 then checks to determine whether the width count table is empty and, if so, control returns to the block 126 of FIG. 10A where j is incremented by one and control returns to the block 110. On the other hand, if the block 142 determines that the width count table is not empty, control passes to a block 144 which checks to determine whether a horizontal stroke in the rotated image can be defined. This programming is represented by the flowchart of FIGS. 17A–17G, FIGS. 18A, 18B, FIG. 19, FIGS. 20A, 20B and FIGS. 21 and 22 as described in greater detail hereinafter.

If the block 144 determines that a horizontal stroke cannot be defined, a block 146 resets the variable j to the initial value jSTART and control returns to the block 126, FIG. 10A.

If the block 144 determines that a horizontal stroke can be defined, the block 146 is skipped and control passes directly to the block 126.

The programming of FIGS. 10A–10C is iteratively executed for each pixel in the image file searching for horizontal edges and determining vertical run lengths. Eventually, the variable i is incremented by the block 112 to a value which exceeds the variable LINNO, at which point further programming may be terminated.

Optionally, programming analogous to that shown in FIGS. 10A–10C can be executed at this point to search for vertical edges and horizontal run lengths in the rotated image. In this case, the variable TYPE would be set equal to a value indicating that vertical edges are being found and the programming of FIGS. 10A–10C would be modified so that pixels would be checked top-to-bottom and then left-to-right, as opposed to the left-to-right and top-to-bottom sequence undertaken by the programming of FIGS. 10A–10C. Also in this case, tests and assignments undertaken by the programming would be modified to check for satisfaction of one or more vertical edge conditions rather than one or more horizontal edge conditions. Thus, for example, the assignment of the block 116 would be changed such that the value of dvDOWN is set equal to the digital value of the pixel at the position i, j+1. As a further example, the block 132 would be modified to set W equal to the horizontal run length of the stroke portion. This search for vertical edges in the rotated image can be used to smooth such edges, if desired. However, inasmuch as the presence of artifacts creating a jagged appearance in vertical edges in the rotated image (which are horizontal edges in the non-rotated image observed by a reader) are typically not as visually distracting to a reader as jagged horizontal edges in the rotated image (i.e. jagged vertical edges in the nonrotated image), this portion of the programming can be dispensed with, if desired.

Figure 11:
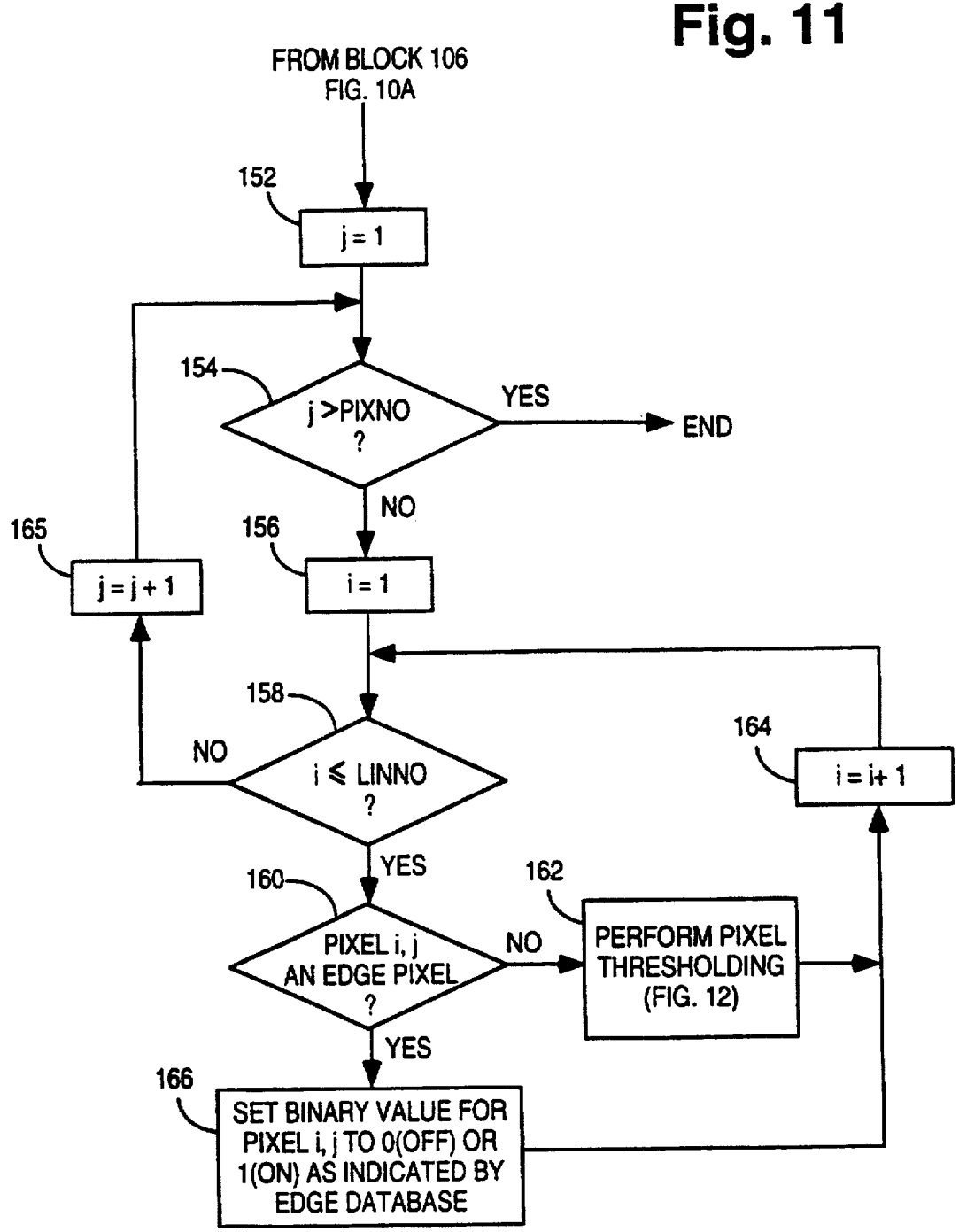

FIG. 11 illustrates programming for assigning output values to pixels. The programming begins at a block 152 which resets the value of the variable j to one and a block 154 then checks to determine whether j is greater than the variable PIXNO. During the first pass through the programming of FIG. 11, the block 154 determines that this is not the case and control passes to a block 156 which sets the variable i equal to one. A block 158 then checks to determine if i is less than or equal to the variable LINNO. During this first pass through the program, this is found to be the case and a block 160 checks to determine whether the pixel at the coordinates i, j is already in the edge database as an edge pixel. If not, a block 162 executes the programming represented by the flowchart of FIG. 12 to determine whether the pixel at the coordinates i, j is greater than the threshold. Thereafter, control passes to a block 164 which increments the value of i and control returns to the block 158.

If the block 158 determines that i is not less than or equal to LINNO, a block 165 increments j by one and control returns to the block 154.

If the block 160 determines that the pixel at the coordinates i, j is already in the edge database, control passes to a block 166 which sets a binary value associated with the pixel i, j to either a zero (or off value) or a one (or on value) as indicated by the edge database. The binary value determines whether the corresponding pixel in the output reproduction is to be white or black. Following the block 166, control passes to the blocks 164 and 158.

Figure 12:
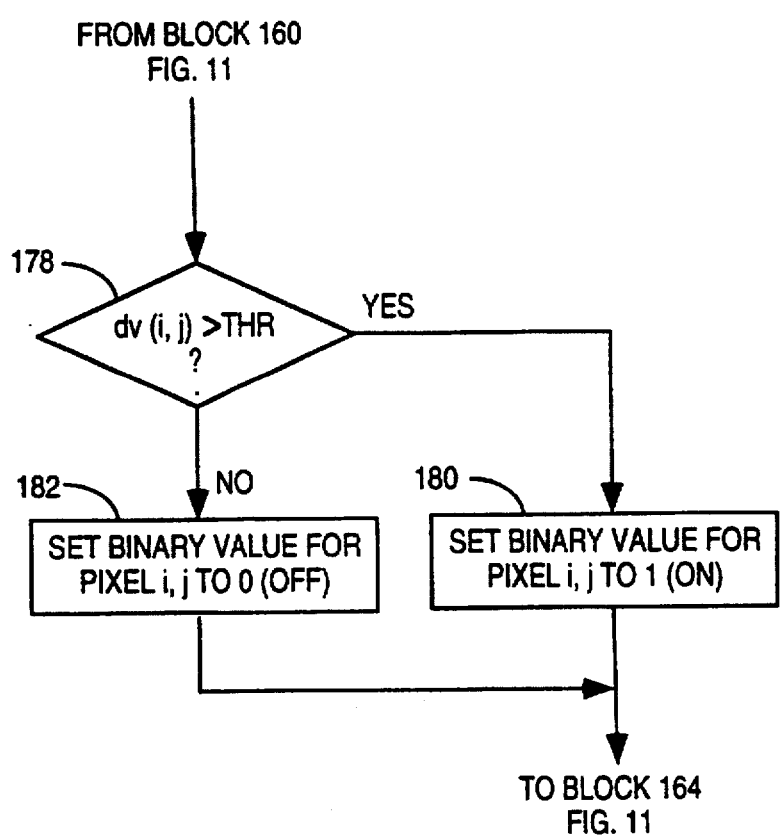

Referring now to FIG. 12, the program for implementing the block 162 of FIG. 11 begins at a block 178 which checks to determine whether the digital value of the pixel at the coordinates i, j is greater than a threshold value THR initialized by the block 100 of FIG. 10A. If yes, then the binary value for the pixel i, j in the output reproduction is set to one by a block 180; otherwise, the binary value for the pixel at the coordinates i, j is set to zero by a block 182. Control from the blocks 180 and 182 returns to the block 164 of FIG. 11.

Figure 13:
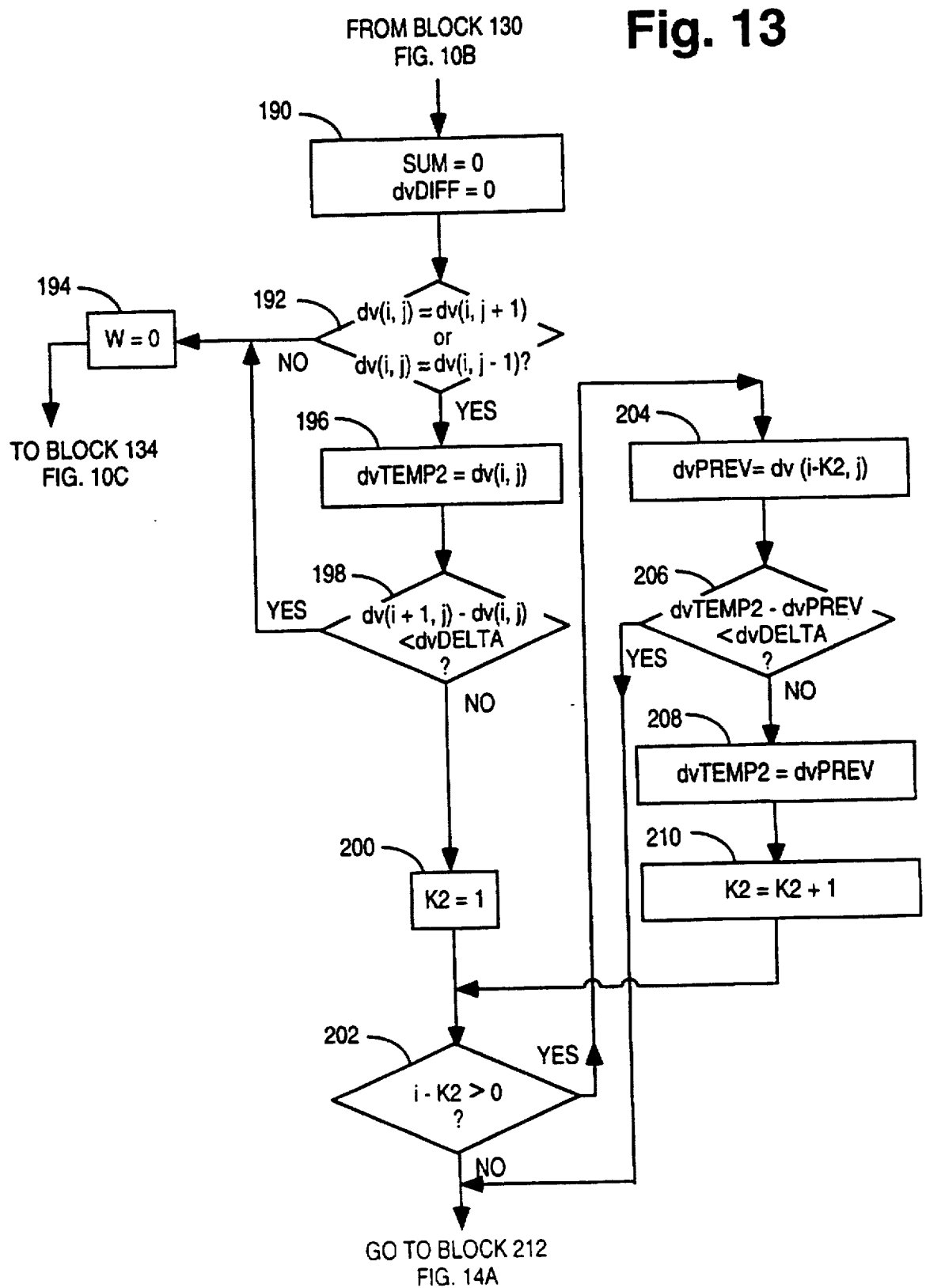

FIG. 13 and FIGS. 14A–14C illustrate programming for calculating the variable W. Referring first to FIG. 13, a block 190 sets a pair of variables SUM and dvDIFF equal to zero. The variable SUM is a temporary variable which is also used later in connection with FIGS. 23A, 23B. A block 192 then checks to determine whether the digital value of the pixel at the coordinates i, j is approximately equal to the digital values of the pixels to the right or left thereof. The determination of whether two values are approximately equal is made by ascertaining whether the two values are exactly equal or whether they vary by no more than the value of the variable sTOL as determined by the block 128 of FIG. 10B. If the answer to the query posed by the block 192 is negative, indicating that the pixel currently under consideration is on a corner or is at the intersection of two strokes, a block 194 sets the variable W equal to zero. Thereafter, control returns to the block 134 of FIG. 10C.

If the block 192 determines that the digital value of the pixel at the coordinates i, j is approximately equal to the digital value of one of the adjacent pixels on the same line, a block 196 assigns the digital value of the pixel at the coordinates i, j to a temporary variable dvTEMP2. A block 198 then checks to determine whether the difference between the digital value of the pixel at the coordinates i+1, j and the digital value of the pixel at the coordinates i, j is less than the value dvDELTA. If so, this difference is of a sufficiently small magnitude to indicate that the pixel at the coordinates i, j is not on an edge, and hence control passes to the block 194 where w is set equal to zero. If not, control passes to a block 200 which sets a variable K2 equal to one. A block 202 then checks to determine whether the difference between the values of i and K2 is greater than zero. If so, a block 204 sets the value of a variable dvPREV equal to the digital value of the pixel at the coordinates i–K2, j. The blocks 202 and 204 prevent a later consideration of pixels outside the image. A block 206 then checks to determine whether the value of the variable dvTEMP2 minus the value of the variable dvPREV is less than dvDELTA. If not, the variable dvTEMP2 is set equal to dvPREV by a block 208, the value of the variable K2 is incremented by one by a block 210 and control returns to the block 202.

Figure 14A:
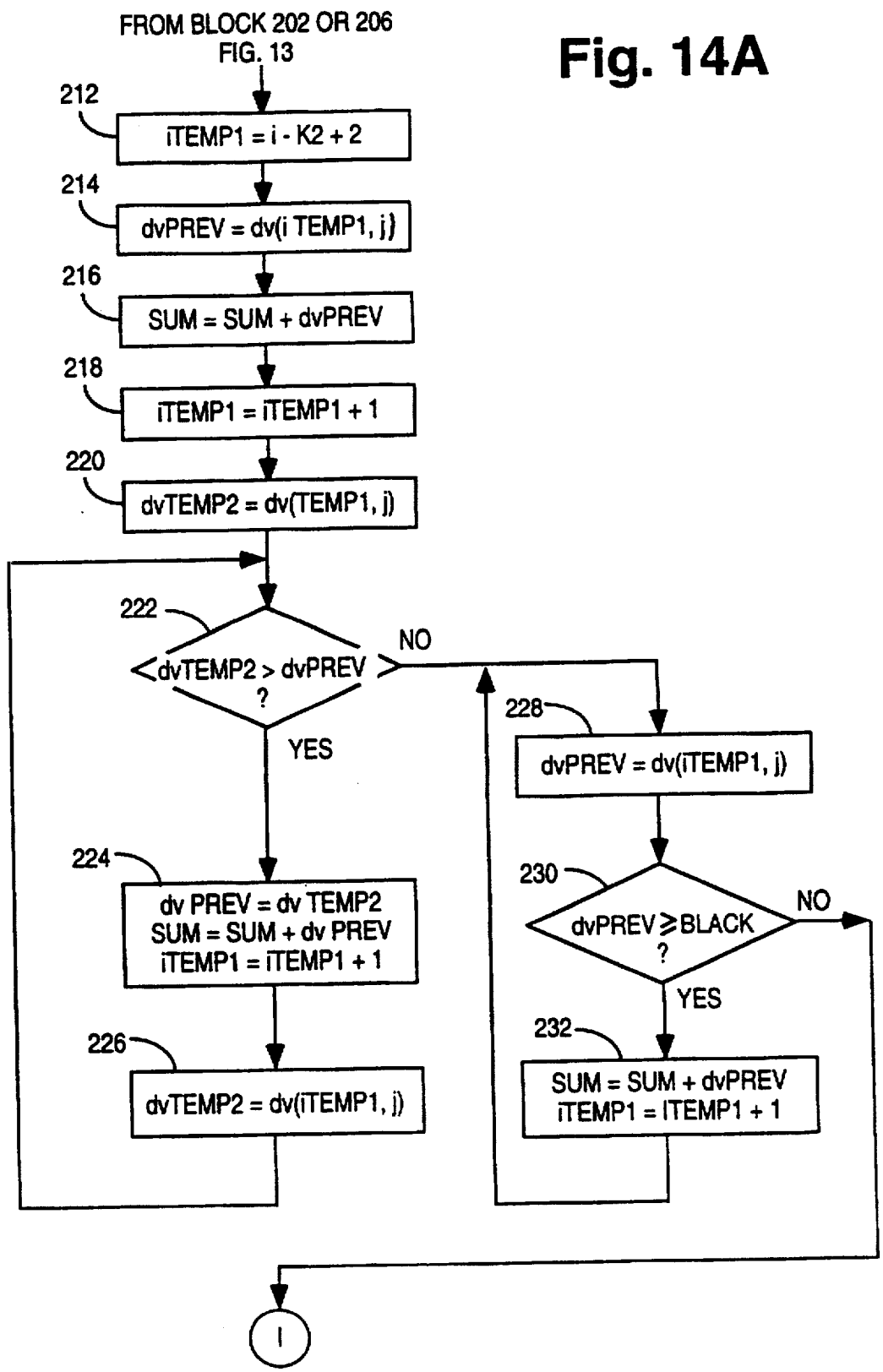

If the block 202 determines that the difference between the variable i and the variable K2 is not greater than zero, or if the block 206 determines that the difference between dvTEMP2 and dvPREV is less than dvDELTA, control passes to a block 212 of FIG. 14A. The blocks 200, 202, 204, 206, 208 and 210 find the true beginning of an edge or transverse extent of a stroke. This is required because some scanners tend to smooth or blur edges.

The block 212 sets the value of a variable iTEMP1 equal to the current value of i minus the value of K2 plus two. A block 214 sets the value of the variable dvPREV equal to the digital value of the pixel at the coordinates iTEMP1, j. A block 216 augments the value of the variable SUM by the value dvPREV while a block 218 increments the value of the variable iTEMP1 by one and a block 220 sets the value of the variable dvTEMP2 equal to the digital value of the pixel at the coordinates iTEMP1, j.

A block 222 then checks to determine whether the value of dvTEkP2 is greater than the value of dvPREV. If so, a block 224 sets the value of dvPREV equal to dvTEMP2, augments the value of SUM by dvPREV and increments the value of iTEMP1 by one. A block 226 then sets the value of dvTEMP2 equal to the digital value of the pixel at coordinates iTEMP1, j and control returns to the block 222. The blocks 222, 224 and 226 again deal with blurred edges where the digital values are increasing in magnitude but have not reached the maximum value.

If the block 222 determines that dvTEkP2 is not greater than dvPREV, a block 228 sets the value of dvPREV equal to the digital value of the pixel at coordinates iTEMP1, j and a block 230 checks to determine whether the current value of dvPREV is greater than or equal to a value BLACK which, in the preferred embodiment, is equal to 255. If this is found to be true, a plateau section has been found wherein digital values in a neighborhood of pixels are at or near the maximum value. In this case a block 232 augments the value of SUM by dvPREV and increments the value of iTEMP1 by one. Control then returns to the block 228.

Figure 14B:
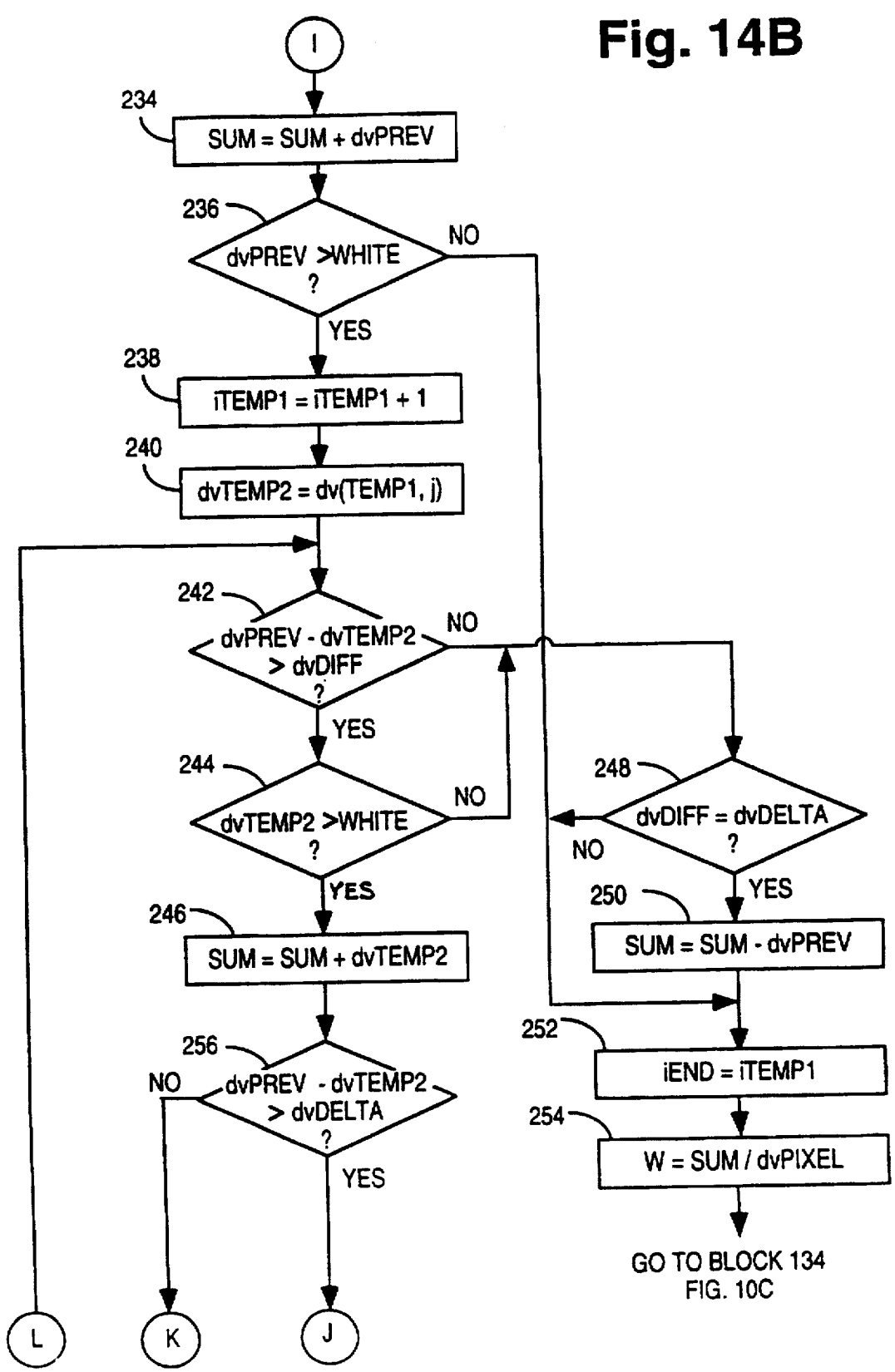

If the block 230 determines that dvPREV is not greater than or equal to BLACK, control passes to a block 234, FIG. 14B, which augments the value of SUM by dvPREV. The block 236 then checks to determine whether dvPREV is greater than a value WHITE which, in the preferred embodiment, is equal to zero. If the value of dvPREV is greater than the value of WHITE, a pair of blocks 238 and 240 increment the value of iTEMP1 by one and set the value of dvTEMP2 equal to the digital value of the pixel at the coordinates iTEMP1, j.

A block 242 checks to determine whether the difference between dvPREV and dvTEMP2 is greater than dvDIFF. If so, a block 244 checks to determine whether dvTEMP2 is greater than the value of WHITE. If this is also the case, control passes to the block 246 which augments the value of SUM by the value of dvTEMP2.

If either of the queries posed by the blocks 242, 244 is answered in the negative, a block 248 checks to determine whether the value of dvDIFF is equal to dvDELTA. If so, the value of SUM is decreased by the value dvPREV by a block 250. Thereafter, a block 252 sets the value of a variable iEND equal to the value iTEMP1 and a block 254 establishes the value of W equal to the value of SUM divided by the value of a constant dvPIXEL which, in the preferred embodiment, is equal to 255. If it is considered desirable to widen strokes that are to be smoothed, the value of dvPIXEL can be reduced somewhat. Similarly, dvPIXEL can be increased somewhat if it is desirable to thin strokes that are to be smoothed. Note that this thinning (or thickening) is independent of the thresholding performed on pixles which are not part of a smoothed stroke. Thus, the smoothed strokes can be thinned without losing detail in other parts of a character.

Following the block 254, control returns to the block 134 of FIG. 10C.

If the block 236 determines that the value of dvPREV is not greater than the value of WHITE, or if the block 248 determines that dvDIFF is not equal to dvDELTA, control passes directly to the block 252.

Following the block 246, a block 256 checks to determine whether the difference between dvPREV and dvTEMP2 is greater than dvDELTA. If so, a block 258, FIG. 14C, sets dvDIFF equal to dvDELTA and a block 260 sets the value of dvPREV equal to dvTEMP2. A block 262 then augments the value of iTEMP1 by one and a block 264 establishes the value of dvTEMP2 equal to the digital value of the pixel at coordinates iTEMP1, j. Thereafter, control returns to the block 242 of FIG. 14B.

Figure 14C:
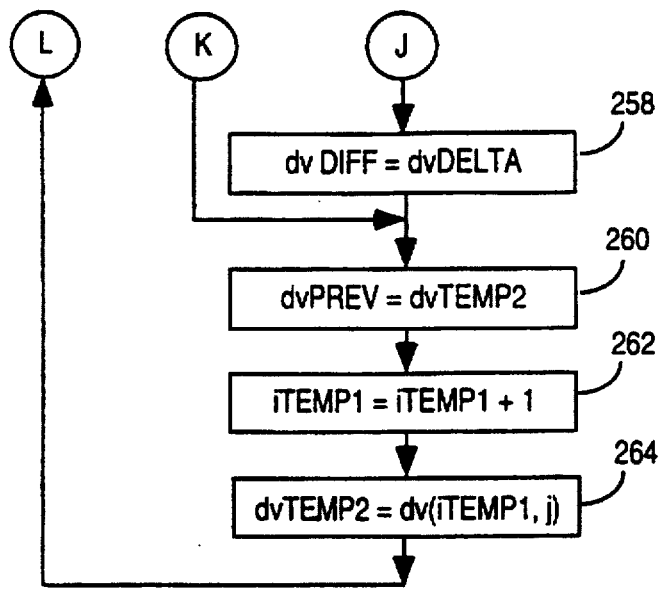

If the block 256 of FIG. 14B determines that the difference between dvPREV and dvTEMP2 is not greater than dvDELTA, the block 258 is skipped and control passes directly to the block 260 of FIG. 14C.

As noted above, FIG. 15 illustrates the programming executed by the block 122 of FIG. 10B to calculate the length L of an edge. A block 270 sets the value of L equal to one, establishes the value of a variable r equal to the value of dvTEMP1 divided by dvDOWN and sets the variable sTOL equal to r multiplied by pTOL. A block 272 then increments the value of j by one and a block 274 checks to determine whether the digital value of the pixel at the coordinates i+1, j is greater than zero to avoid a later divide-by-zero condition. If the digital value of this pixel is greater than zero, a block 276 checks to determine whether the value of r as established by the block 270 is approximately equal to the digital value of the pixel at the current coordinates of i, j divided by the digital value of the pixel next below the first named pixel, i.e., the pixel at the coordinates i+1, j. As before, the block 276 determines whether the two values differ from one another by an amount no greater than sTOL. If the query posed by the block 276 is answered in the affirmative, then it has been determined that the next pixel lies on the same edge, and hence a block 278 increments the value of L by one and control returns to the block 272 where the next pixel to the right is selected. Control remains with the blocks 272–278 until either of the blocks 274, 276 determines that the query posed thereby is answered in the negative. At that point, control returns to the block 124 of FIG. 10B.

As noted above in connection with FIG. 10C, FIG. 16 illustrates the programming executed by the block 136 to enter a pixel having a width W into the width count table. With reference to FIG. 16, a block 280 sets a pointer to the first group entry in the width count table. As noted previously, the width count table is subdivided into group entries, each of which includes one or more pixels each having a certain value of W associated therewith. The block 280 also sets the value of the variable sTOL equal to a predetermined multiple of pTOL, for example, a multiple of two. A block 282 then determines whether all entries in the table have been considered. Immediately after execution of the block 280, the answer to the query posed by the block 282 is affirmative and control passes to a block 284 which checks to determine whether the current value of W is within the value sTOL of the width $W_G$ associated with the group entry currently under consideration (i.e., the entry to which the pointer is set). If this is found not to be the case, the group entry pointer is advanced to the next group entry in the table by a block 286 and control returns to the block 282. The current value of W is thus compared with the group entries in the table until a match is found between W and the width $W_G$ associated with one of the group entries. Once this occurs, control passes from the block 284 to a block 287 which groups the pixel i, j with the current group entry and associates the width W and the current value of iEND with such pixel. That is, the current pixel is added to the table with other pixels in the group entry having an approximately equal width. Following the block 287, a block 288 increments by one the group count associated with the group entry to which the pixel i, j has been added and control returns to the block 138 of FIG. 10C.

If no group entry is found having an associated group entry width $W_G$ approximately equal to the width W associated with the current pixel at the coordinates i, J, a new group entry is created in the table by a block 290 having a group count equal to one and a group entry width $W_G$ equal to W. The pixel at the coordinates i, j is then grouped with the newly-created group entry by a block 292. Control thereafter returns to the block 138 of FIG. 10C.

Figure 17A:
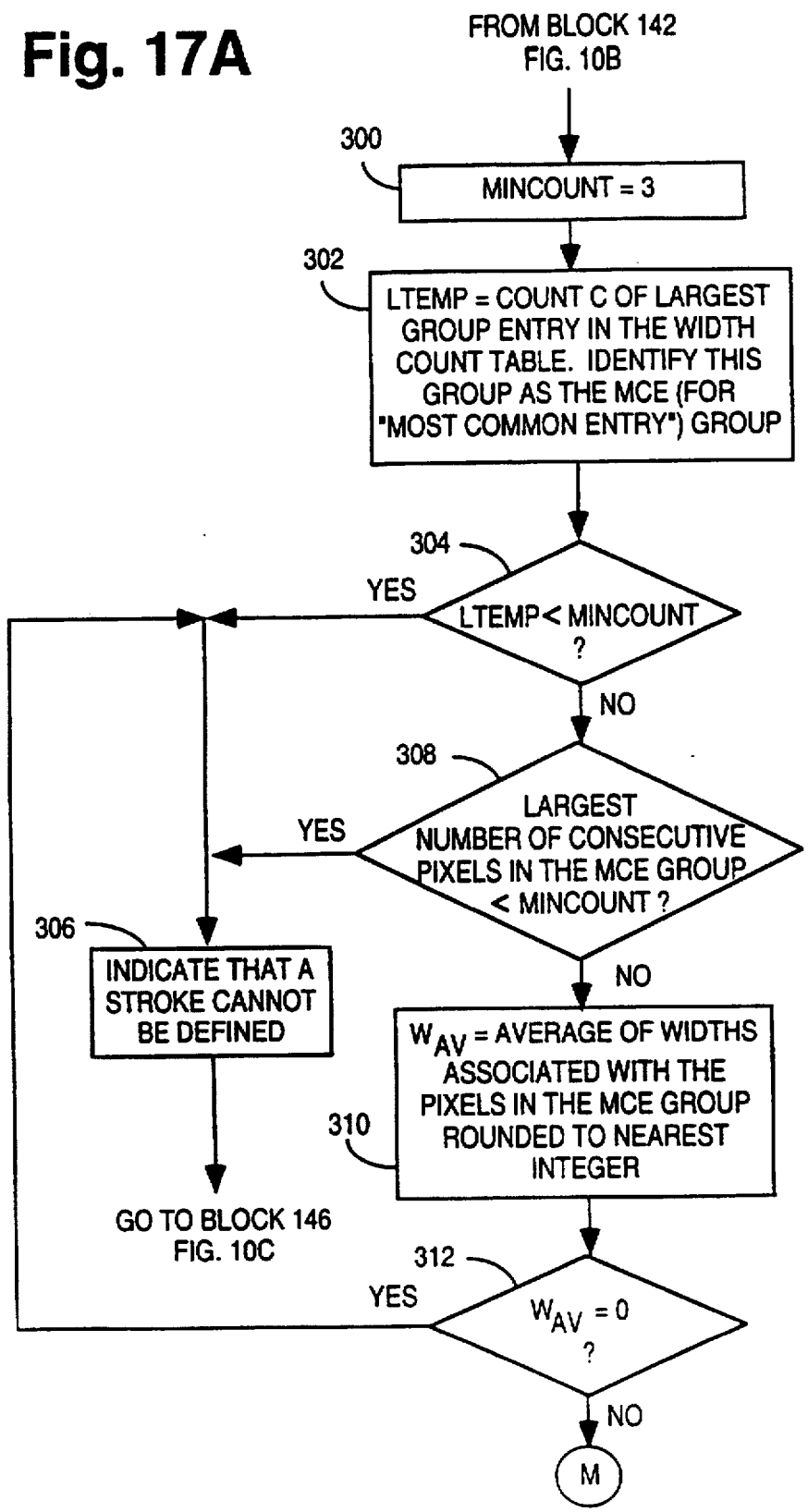

FIGS. 17A–17G illustrate the programming executed by the block 144 of FIG. 10C to determine whether a stroke can be defined. Referring first to FIG. 17A, a block 300 sets the value of a constant MINCOUNT equal to three in the preferred embodiment. A block 302 then sets the value of a variable LTEMP equal to the count C of the group entry in the width count table having the highest group count. This group is identified as the MCE ("most common entry") group. A block 304 then checks to determine whether the value of LTEKP is less than the value of MINCOUNT. If yes, then a decision has been made that there is no group in the width count table having at least a minimum number of pixels and hence control passes to a block 306 which generates an indication that a stroke cannot be defined. Following the block 306, control returns to the block 146 of FIG. 10C.

On the other hand, if the block 304 determines that the MCE group contains at least the number of pixels defined by MINCOUNT, a block 308 checks to determine whether the largest number of consecutive pixels in the MCE group is less than the value of MINCOUNT. In other words, the block 308 checks to determine whether there is at least MINCOUNT adjacent pixels in the image file which are part of the MCE group. If the largest number of adjacent pixels in the MCE group is less than MINCOUNT, then it has been determined that there is no stroke which can be defined having a minimum length of MINCOUNT and hence control passes to the block 306. On the other hand, if the largest number of adjacent pixels in the MCE group is at least equal to MINCOUNT, a block 310 calculates a value $W_{AV}$ comprising an average of the widths W associated with the pixels in the MCE group rounded to the nearest integer. As an example of how the programming works in this regard, assume that the image file comprises digital values represented by the numbers in the grid of FIG. 4. The widths W calculated by the block 254 of FIG. 14B and associated with pixels p1–p10 are calculated as follows:

$W(p1)=(64+128+128+128+64)/256=2$ $W(p2)=W(p3)=W(p4)=W(p5)=W(p6)=W(p7)=W(p8)=W(p9)=(128+256+256+256+128)/256=4$ $W(p10)=(32+64+64+64+32)/256=1$ where W(p1) denotes the width associated with the pixel p1, W(p2) denotes the width associated with the pixel p2, and so on. In this case, the pixels p2–p9 are members of the MCE group and $W_{AV}$ representing the average of the widths associated with these pixels, is equal to four. If the widths of the MCE group were fractional, the value $W_{AV}$ would be the average of these widths rounded to the nearest integer.

Referring again to FIG. 17A, following the block 310, a block 312 checks to determine whether the value $W_{AV}$ is equal to zero. Such a condition can occur when the average of the widths prior to rounding was less than one-half. If so, a stroke cannot be defined, and hence control passes to the block 306. Otherwise, a block 316, FIG. 17B, sets the value of a temporary jTEMP equal to the horizontal coordinate of the middle pixel of the MCE group, selects the column defined by the horizontal coordinate jTEMP and finds the set of $W_{AV}$ contiguous pixels in the selected column having the greatest sum of digital values. In the example of FIG. 4, C is equal to eight, and hence jTEMP equals the horizontal coordinate of the fourth pixel in the MCE group. Because there is an even number of pixels in the MCE group, an arbitrary decision could be made to designate the pixel p6 as the middle pixel, if desired. In any event, the block 316 selects the column containing the middle pixel and finds the four contiguous pixels in a section of this column having the greatest sum of digital values. In the case shown in FIG. 4, the four contiguous pixels beginning with the pixel p5 together with the three pixels immediately below the pixel p5 comprise a first set of $W_{AV}$ contiguous pixels whereas the four pixels below the pixel p5 comprise a further set of $W_{AV}$ contiguous pixels. Also in this case, the sums of the digital values of the two sets are equal, and hence an arbitrary decision is made to select the four contiguous pixels including the pixel p5. Of course, a decision may be made to select the four pixels below the pixel p5, if desired. Once the set of $W_{AV}$ contiguous pixels having the greatest sum of digital values is found, a temporary variable iTOP is set equal to the vertical coordinate of the topmost pixel of the set. In this case, iTOP equals two and jTEMP equals six. The programming for accomplishing the function of the block 316 is described hereinafter in connection with FIGS. 23A and 23B.

Following the block 316, a block 318 checks to determine whether the pixel at the coordinates iTOP, jTEMP is in the edge database. If so, then a binary value has already been established for the pixel and hence a block 320 checks to determine whether this binary value is equal to zero (or off). If this is found to be the case, then a block 322 checks to determine whether the pixel displaced by $W_{AV}$ pixels downwardly from the pixel at the coordinate iTOP, jTEMP is in the edge database. If this is also found to be the case, a block 324 checks to determine whether the value of LINNO has been exceeded by the sum of iTOP plus $W_{AV}$. If not, the value of iTOP is incremented by one by a block 326 and control passes to a block 344 of FIG. 17C.

Control passes from each of the blocks 320, 322 and 324 to the block 344 if any of the queries posed thereby is answered in the negative.

If the block 318 determines that the pixel at the coordinates iTOP, jTEMP is not in the edge database, a block 328, FIG. 17C, checks to determine whether the pixel disposed at a location $W_{AV}$ below the pixel at the location iTOP, jTEMP is in the edge database. If yes, a block 330 determines whether the binary value for the pixel at such coordinate is equal to one (or on). If this is also true, a check is made by a block 332 to determine whether the sum of the values iTOP and $W_{AV}$ is less than the variable LINNO. If this is also true, the value of iTOP is incremented by one by a block 334.

If the query posed by the block 328 is answered in the negative, a block 336 checks to determine whether the pixel at the coordinates iTOP+$W_{AV}$−1, jTEMP is in the edge database. If this is true, a block 338 determines whether the binary value for such pixel is equal to zero. If this is also true, the value of iTOP is decremented by one.

Following the blocks 340 and 334, a block 342 sets the value of a variable EDGETYPE equal to a value indicating a positive edge, i.e., an edge denoting a white-to-black transition, and further sets the value of a variable iTEMP2 equal to the value of iTOP. Control also passes to the block 342 from one of the blocks 330, 332, 336 and 338 if the question posed by such block is answered in the negative.

Following the block 342 is a block 344 which designates the first group entry in the width count table as the current group. A block 346 then retrieves the first pixel from the current group and sets a variable jIN equal to the horizontal coordinate of this pixel and designates the pixel at the coordinates iTEMP2, jIN as the current pixel. A block 348, FIG. 17D, creates a new empty group entry in memory which will contain pixels on the same horizontal edge. A block 350 then checks to determine whether the current pixel is already in the new group. During the first pass through the program, a determination is made that the current pixel is not already in the new group and hence the current pixel and the horizontally contiguous pixels on the same edge are added to the new group by a block 352. This programming is represented by the flowcharts of FIGS. 18A and 18B described hereinafter.

If the current pixel is already in the new group, a determination is made as to whether there are remaining pixels in the current group, and, if so, the next pixel is retrieved from the current group and jIN is set to the horizontal offset of this next pixel. The pixel with coordinates (iTEMP2, jIN) is then referred to as the current pixel. Control then returns to the block 350 to determine if the current pixel is in the new group. Control remains with the blocks 350, 354 and 356 until there are no more pixels in the current group. At that point, a block 357 checks to determine whether the value of EDGETYPE is the positive value, and if so, a block 358 checks to determine whether there are more group entries in the width count table. If this is also true, the next group entry in the width count table is retrieved by a block 360 and is referred to as the current group. The first pixel in the current group is retrieved by a block 362 and jIN is set to the horizontal offset thereof. The pixel with coordinates (iTEMP3, jIN) is then termed the current pixel and control returns to the block 350. In this fashion, the NEW group is assembled and includes those pixels which will reside on an edge in the reproduction.

Once all of the pixels in all of the group entries have been processed, a block 364 updates the MCE group in the fashion described hereinafter in connection with FIG. 20. Following the blocks 364 and 352 and following the block 357 if EDGETYPE is not equal to the positive value, a block 366, FIG. 17E, sets a variable L2 equal to the number of pixels in the MCE group. A variable DEG is then established by a block 368 at a value equal to the value of L2 divided by the value of $W_{AV}$. A block 370 then establishes each of the binary values of the pixels in the NEW group at a value of one (or on). This programming is represented by the flowchart of FIG. 21 described hereinafter.

Following the block 370, a block 372 checks to determine whether the new group is empty. If so, a block 374 sets the value of iTEMP2 equal to the value of iTOP decremented by one and the blocks 346-364 are reexecuted, as represented by the block 376. The variable L2 is then set equal to the number of pixels in the MCE group by a block 378 and the variable DEG is recalculated based on the new values of L2 and $W_{AV}$ by a block 380.

Figure 22:
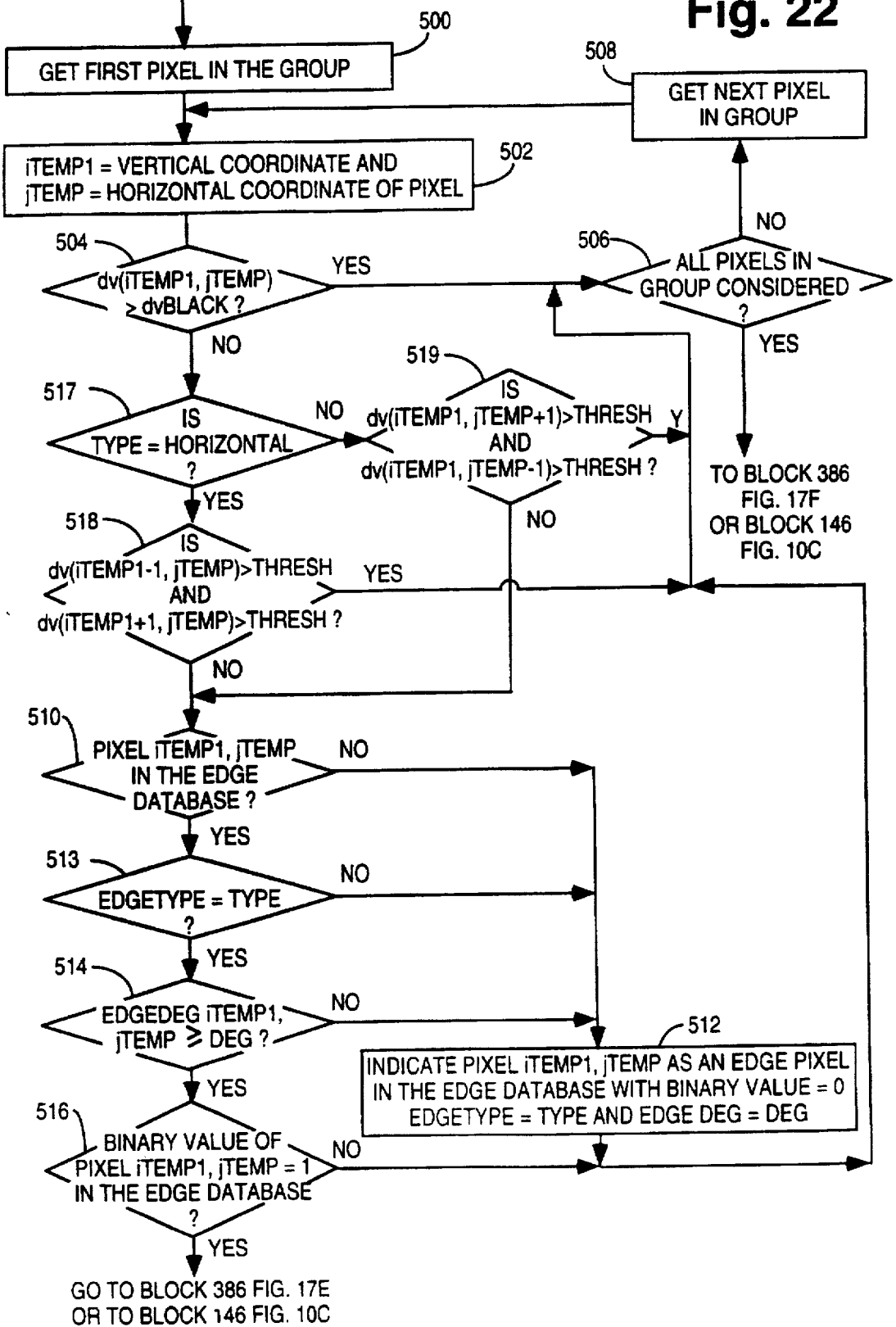

The blocks 374-380 are skipped if a determination is made by the block 372 that the new group is not empty (indicating that a top edge has successfully been found) and, instead, a block 382 is executed which decrements the vertical coordinate of all pixels in the new group by one so that the pixels immediately above the pixels in the new group will be considered. A block 384, FIG. 17F, then sets the binary value associated with the pixels in the NEW group to a value of zero (or off). This programming is illustrated by the flowchart of FIG. 22 described hereinbelow.

Following the block 384, a block 386 empties the new group of all entries and a block 388 sets the value of the variable iTEMP2 equal to iTOP+$W_{AV}$−1 so that consideration is now given to the pixels on the lower edge of a stroke. A block 390 sets the variable EDGETYPE equal to a value indicating a negative edge, i.e., an edge from black to white, and a block 391 designates the MCE group as the current group. Thereafter, the blocks 346-364 of FIGS. 17C and 17D are again reexecuted, as indicated by a block 392. A block 394 then sets the value of DEG equal to the current value L2 divided by $W_{AV}$ and a block 396 sets the binary value associated with the pixels in the NEW group to a value of one (or on). Again, this programming is represented by the flowchart of FIG. 21.

As should be evident from the foregoing, the MCE group is used to define the bottom edge of a stroke.

Following the block 396, a block 398 checks to determine if the new group is empty of all entries. If so, a block 400, FIG. 17G, sets the value of iTEMP2 equal to iTOP+$W_{AV}$ and the blocks 346–364 are again executed. A block 404 then sets the value of DEG equal to the current value of L2 divided by $W_{AV}$ and a block 406 sets the binary values associated with pixels in the NEW group to zero. Following the block 406, control passes to the block 146 of FIG. 10C.

If the block 398 determines that the NEW group is not empty of entries, indicating that the bottom edge of the stroke current under consideration has been found, the blocks 400 and 402 are skipped and, instead, a block 408 is executed which increments the vertical coordinate of all pixels in the NEW group. Control then passes to the blocks 404 and 406 and thence to the block 146 of FIG. 10C.

FIGS. 18A and 18B illustrate the programming executed by the block 352 to add the current pixel and horizontally contiguous pixels on the same edge to the new group. A block 410 sets the value of a variable jS equal to the value jIN and further sets the variable jTEMP equal to jS. In addition, a variable SGN is set equal to positive one if the variable EDGETYPE is equal to the positive value and is set equal to negative one if EDGETYPE is equal to the negative value. A block 412 then sets the variable r equal to the digital value of the pixel at the coordinates iTEMP2, jS divided by the digital value of the pixel at the coordinates iTEMP2+SGN, jS and adds the pixel at the coordinates iTEMP2, jTEMP to the new group.

Figure 18A:
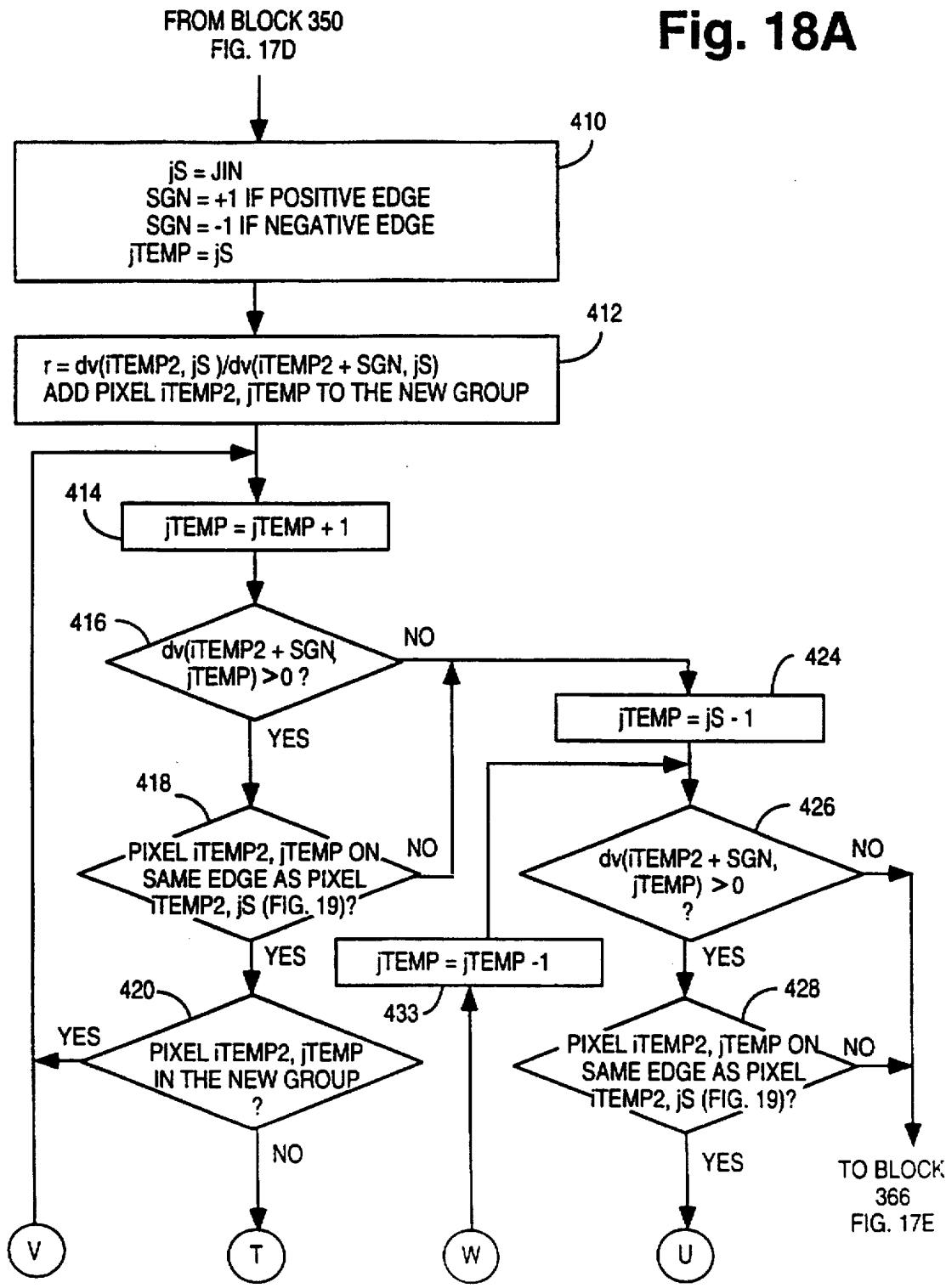
Figure 18B:
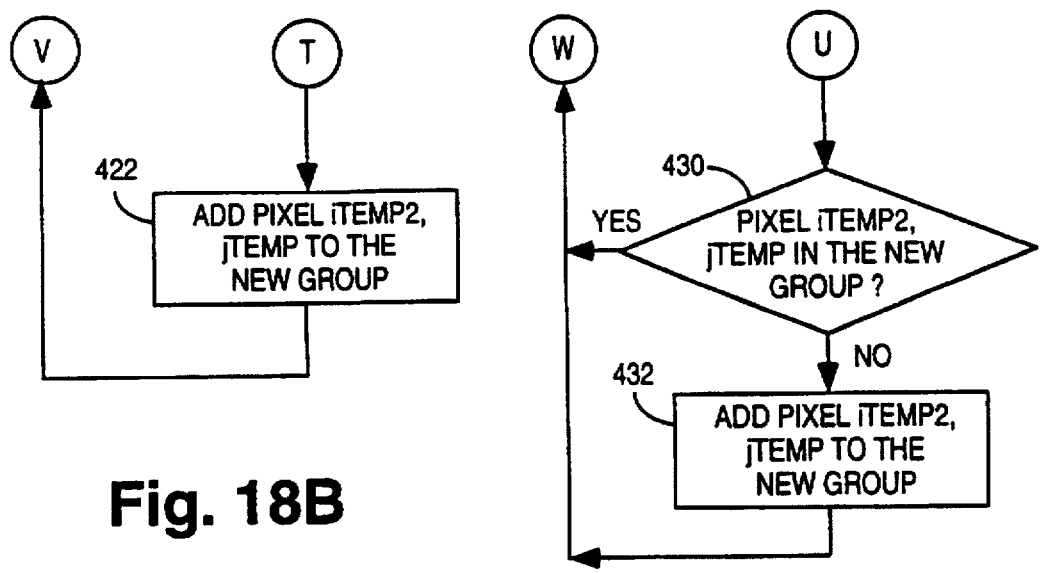
Figure 19:
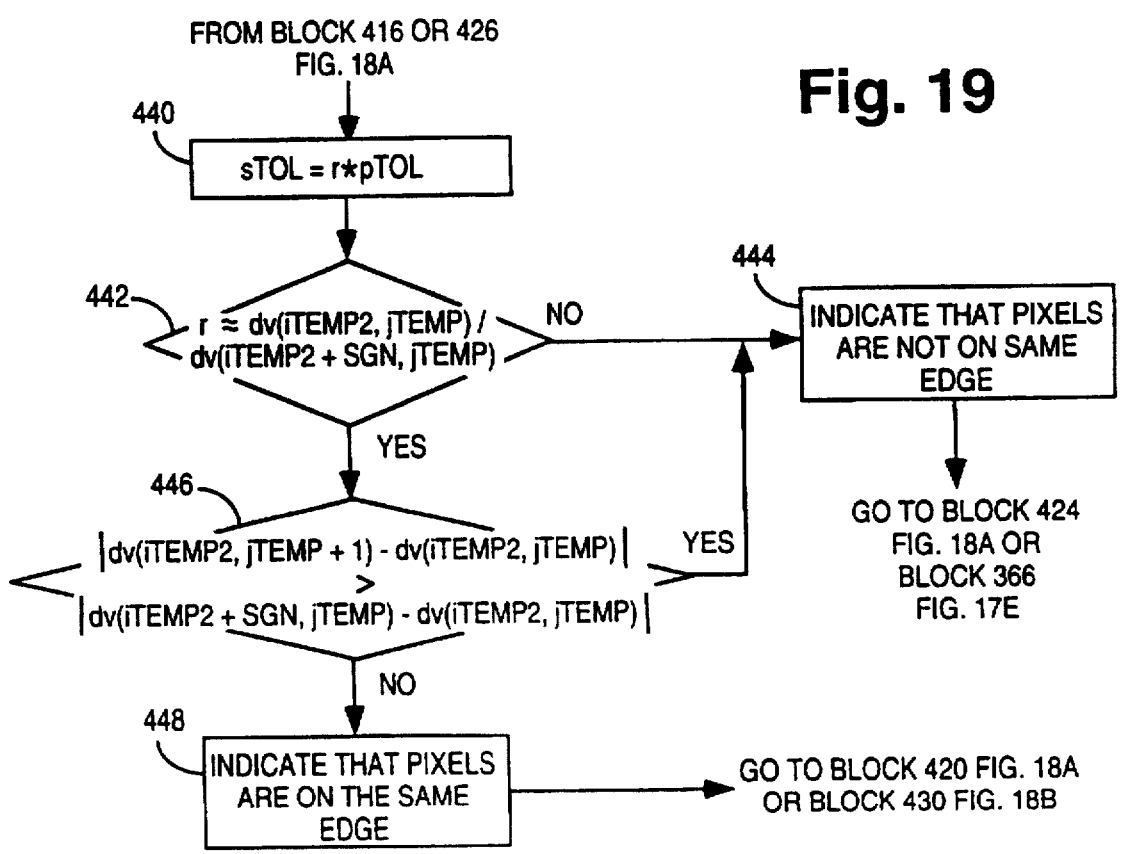

A block 414 then increments the value of jTEMP by one and a block 416 checks to determine if the digital value of the pixel at the coordinates iTEMP2+SGN, jTEMP is greater than zero. If so, a determination is made by a block 418 whether the pixel at the coordinates iTEMP2, jTEMP is on the same edge as the pixel at the coordinates iTEMP2, jS. The programming executed by the block 418 is illustrated in FIG. 19 and is described in greater detail hereinafter. If the answer to the query posed by the block 418 is affirmative, a block 420 checks to determine if the pixel at the coordinates iTEMP2, jTEMP is in the new group. If yes, control returns to the block 414 where the value of jTEMP is incremented. If not, control passes to a block 422, FIG. 18B, which adds the pixel at the coordinates iTEMP2, jTEMP to the new group. Control then returns to the block 414.

If the block 416 determines that the digital value of the pixel at the coordinates iTEMP2+SGN, jTEMP is not greater than zero, or if the answer to the query posed by the block 418 is negative, control passes to a block 424 which sets the value of the variable jTEMP equal to the value of jS minus one. A block 426 checks to determine if the digital value of the pixel at the coordinates iTEMP+SGN, jTEMP is greater than zero. If yes, the programming illustrated in FIG. 19 is executed by a block 428 to determine if the pixel at the coordinates iTEMP2, jTEMP is on the same edge as the pixel at the coordinates iTEMP2, jS. If this is also found to be the case, a block 430, FIG. 18B, determines whether the pixel at the coordinates iTEMP2, jTEMP is in the new group. If not, a block 432 adds the pixel at the coordinates iTEMP2, jTEMP to the new group, a block 433 decrements jTEMP by one and control returns to the block 426, FIG. 18A. Control also returns to the block 426 via the block 433 if the answer to the query posed by the block 430 is positive. Once one of the blocks 426 or 428 determines that the digital value of the pixel at the coordinates iTEMP2+SGN, jTEMP is not greater than zero or that the pixel at the coordinates iTEMP2, jTEMP is not on the same edge as the pixel at the coordinates iTEMP2, jS, control returns to the block 366 of FIG. 17E.

As noted above, FIG. 19 illustrates the programming executed by the blocks 418 and 428 of FIG. 18A. With specific reference to FIG. 19, a block 440 sets the value of sTOL equal to r multiplied by pTOL and a block 442 checks to determine whether the value of r deviates no more than the value sTOL from the digital value of the pixel at the coordinates iTEMP2, jTEMP divided by the digital value of the pixel at the coordinates iTEMP2+SGN, jTEMP. If this is not found to be the case, then a determination has been made that the pixels are not on the same edge and an indication thereof is generated by a block 444 and control then returns to the block 424 of FIG. 18A or the block 366 of FIG. 17E.

If the answer to the query posed by the block 442 is affirmative, a block 446 checks to determine whether the absolute value of the difference between the digital values of the pixels at the coordinates iTEMP2, JTEMP+1 and iTEMP2, jTEMP is greater than the absolute value of the difference between the digital values of the pixels at the coordinates iTEMP2+SGN, jTEMP and iTEMP2, JTEMP. If so, control passes to the block 444 which generates an indication that the pixels are not on the same edge. On the other hand, if the answer to the query posed by the block 446 is answered in the negative, an indication that the pixels are on the same edge is generated by the block 448 and control passes to the block 420 or the block 430 of FIGS. 18A, 18B, respectively.

Figure 17B:
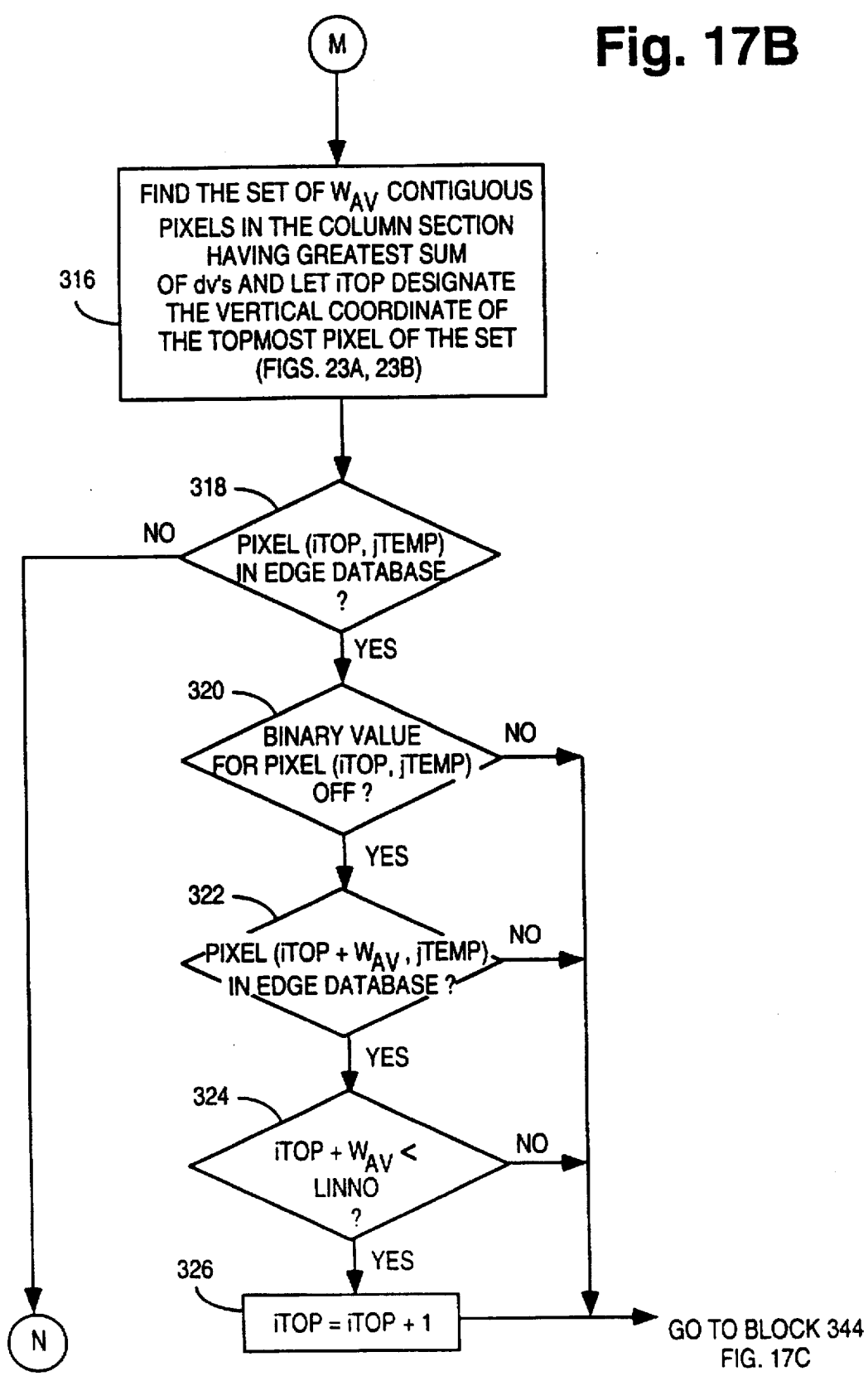
Figure 17C:
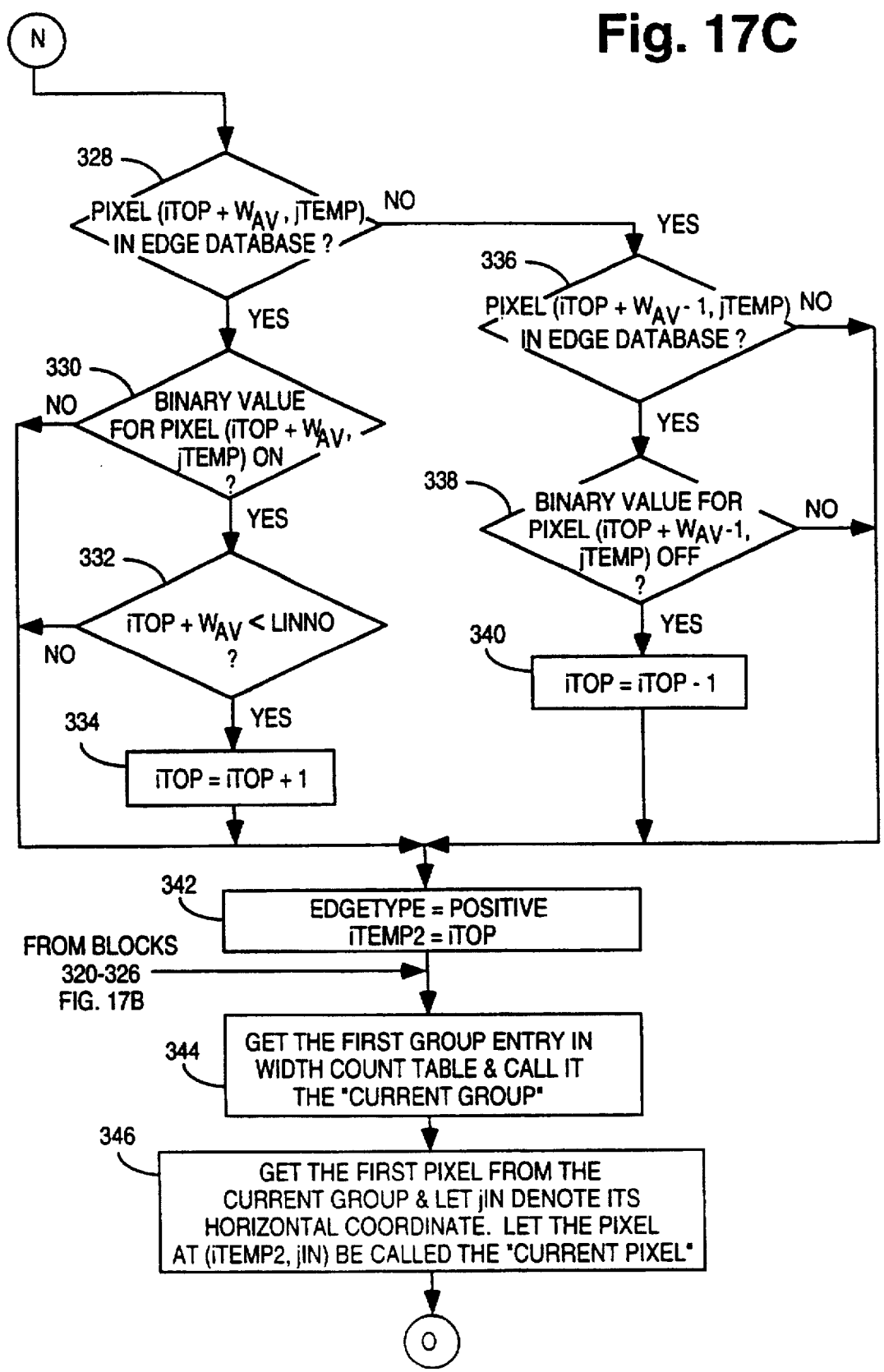
Figure 17D:
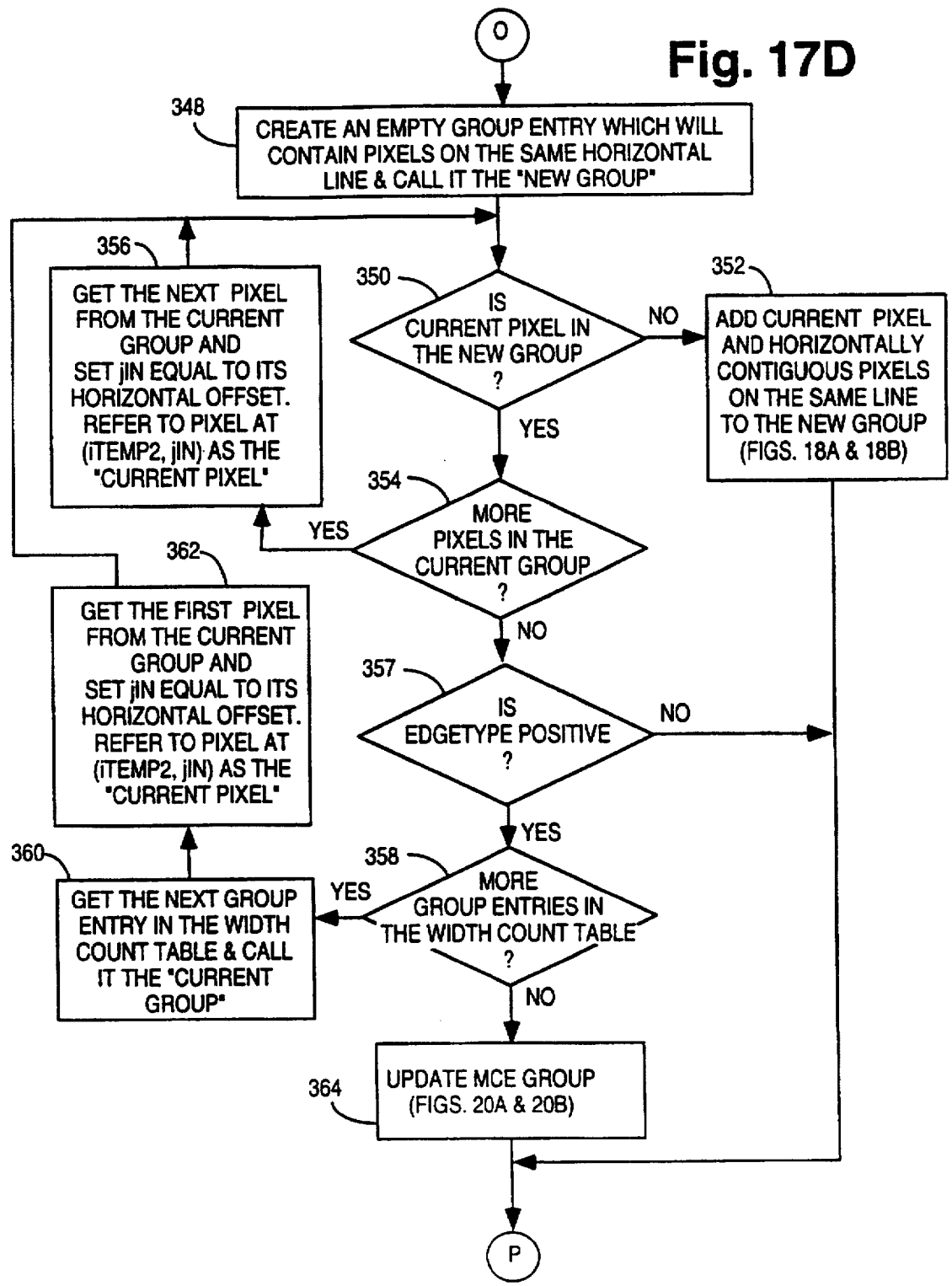
Figure 20A:
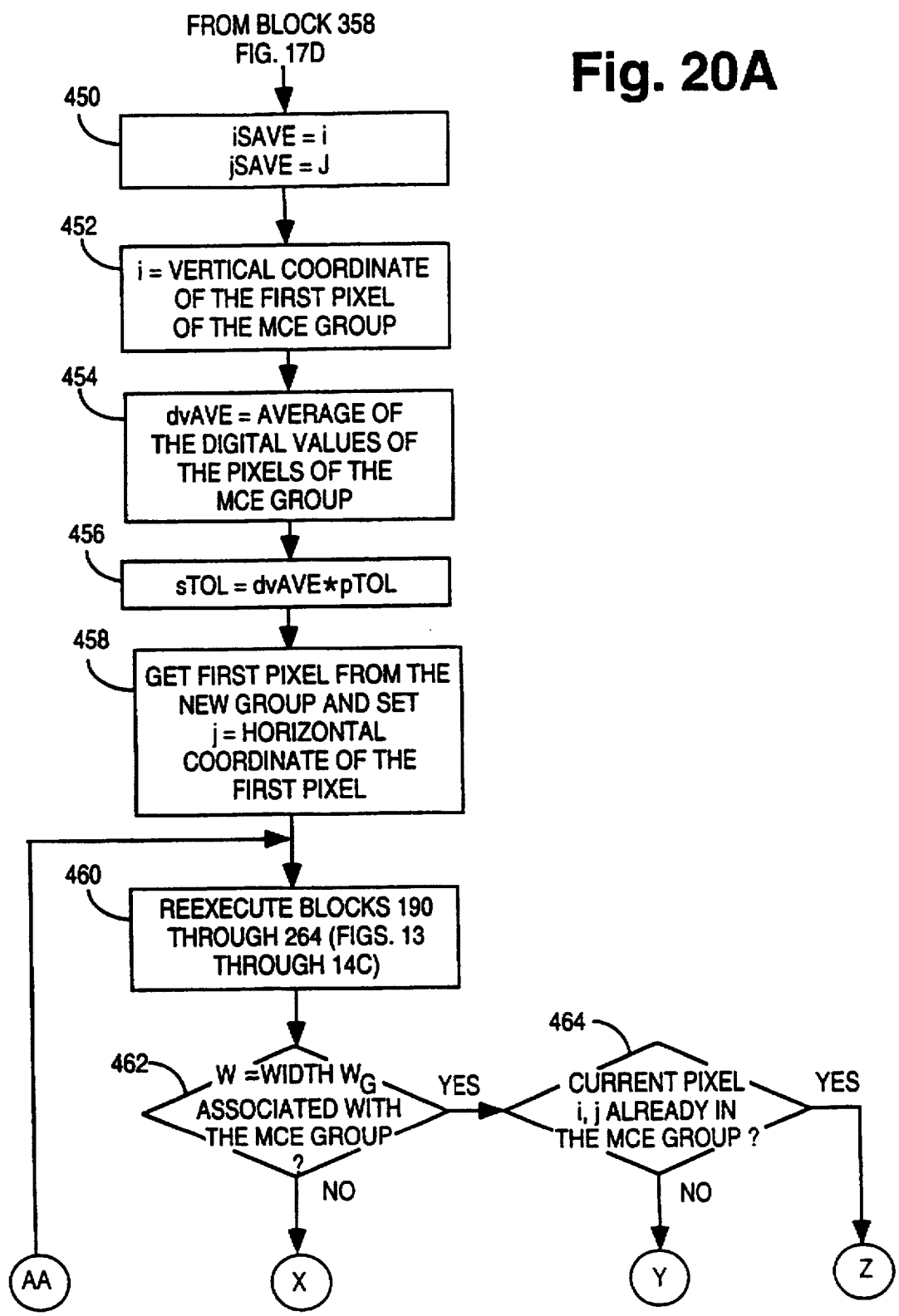
Figure 20B:
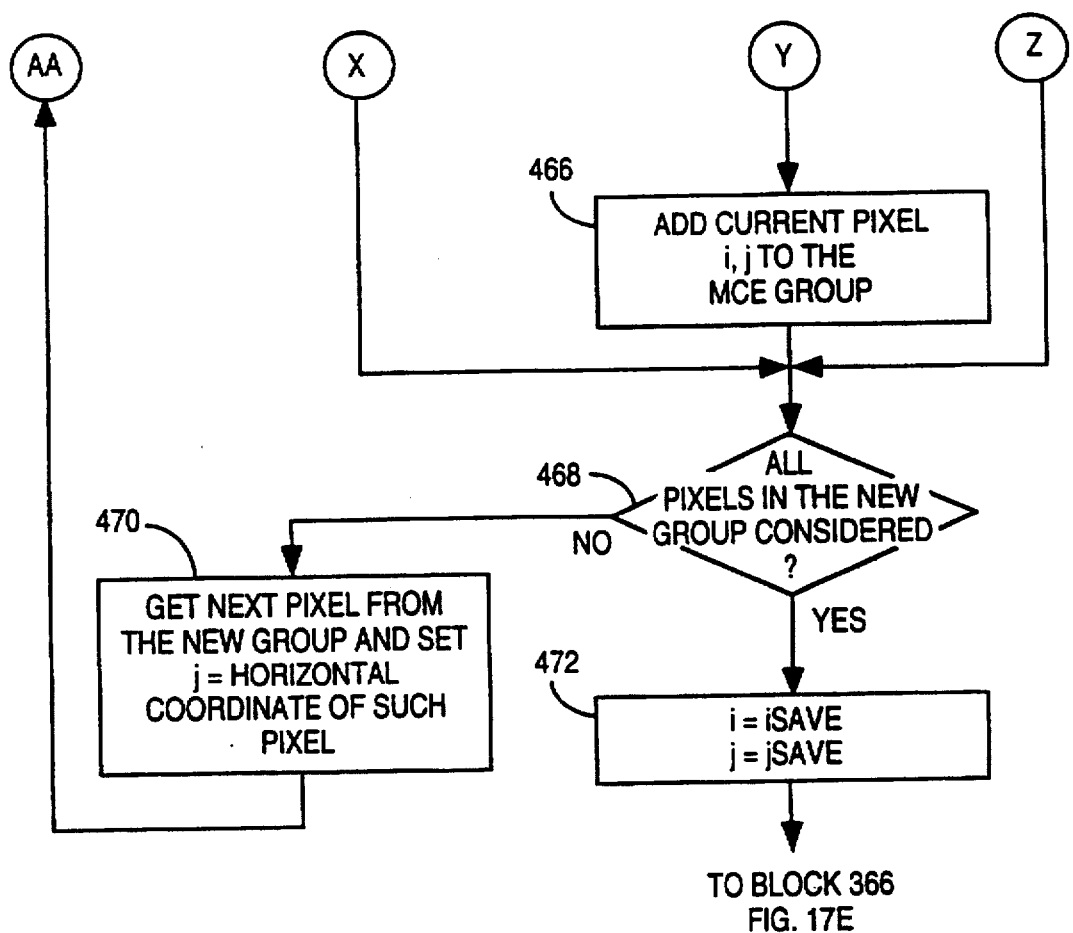
Figure 21:
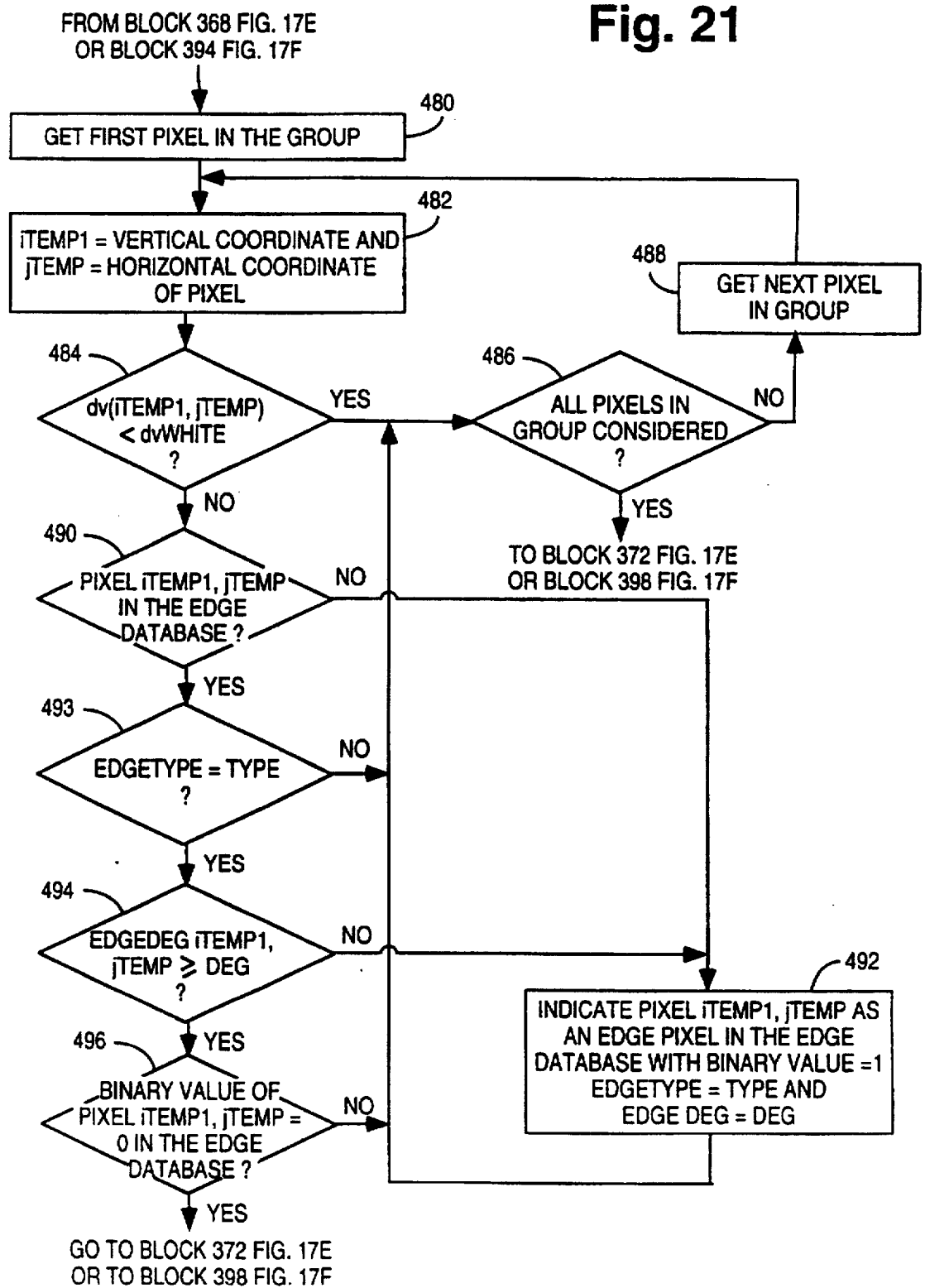

Referring now to FIG. 20A, the updating of the MCE group undertaken by the block 364 of FIG. 17D begins at a block 450 which saves the current values of i and j to a pair of variables iSAVE, jSAVE, respectively. The variable i is then set equal to the vertical coordinate of the first pixel of the MCE group by a block 452. The value of a variable dvAVE is then found by a block 454 by averaging the digital values of the pixels of the MCE group and a block 456 sets the value of the variable sTOL equal to dvAVE multiplied by pTOL. Following the block 456, a block 458 retrieves the first pixel from the new group and sets the variable j equal to the horizontal coordinate of such pixel. Thereafter, the programming represented by blocks 190–264 of FIGS. 13 and 14A–14C is reexecuted, as represented by a block 460. Control from the block 194 of FIG. 13 or the block 254 of FIG. 14B then passes to a block 462 of FIG. 20A where a determination is made as to whether the variable W is within the value sTOL of the width $W_G$ associated with the MCE group. If yes, a block 464 checks to determine whether the current pixel at the coordinates i, j is already in the MCE group. If this is not the case, the current pixel at the coordinates i, j is added to the MCE group by a block 466, FIG. 20B, and control passes to a block 468. The block 466 is skipped if a determination is made by the block 462 that W is not approximately equal to the width $W_G$ associated with the MCE group or if the block 464 determines that the current pixel at the coordinates i, j is already in the MCE group.

The block 468 checks to determine whether all pixels in the new group have been considered. If not, the next pixel in the new group is retrieved and j is set equal to the horizontal coordinate of such pixel by a block 470. Control then returns to the block 460. On the other hand, if all of the pixels in the new group have been considered, a block 472 returns the values of i and j to those which they had prior to execution of the programming of FIG. 20A, i.e., i and j are set equal to the values of iSAVE and jSAVE, respectively. Following the block 472, control passes to the block 366 of FIG. 17E.

Figure 17E:
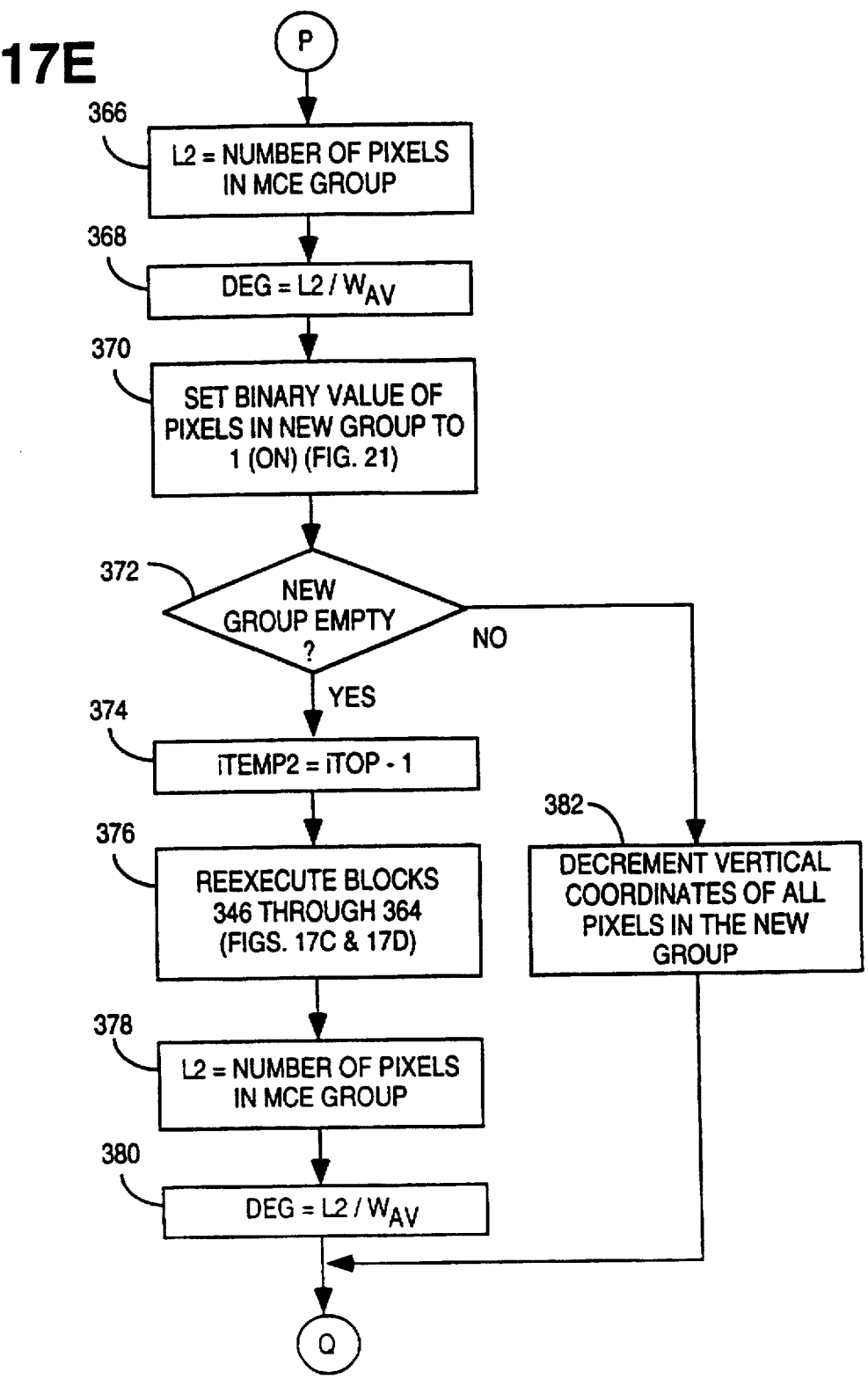
Figure 17F:
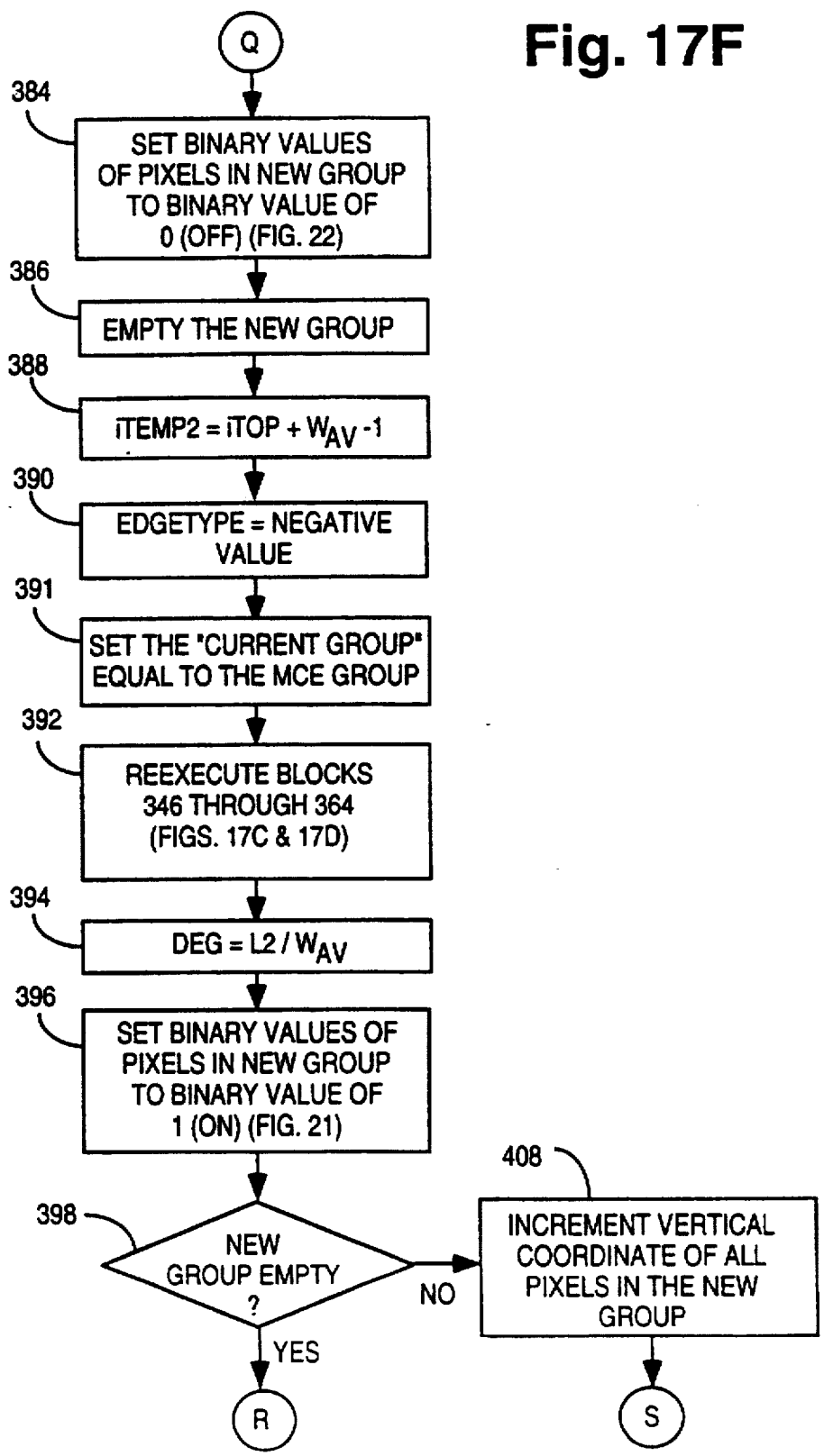

FIG. 21 illustrates the programming executed by the blocks 370 and 396 of FIGS. 17E, 17F, respectively, to set the binary values associated with the pixels in the NEW group to a binary value of one. A block 480 selects the first pixel in the NEW group and a block 482 sets iTEMP1 and jTEMP equal to the vertical and horizontal coordinates, respectively, of such pixel. A determination is then made by the block 484 whether the digital value of the pixel at the coordinates iTEMP1, jTEMP is less than the value of a variable dvWHITE which, in the preferred embodiment is equal to 63. This value is arbitrary and is intended to represent a level that is almost, but not quite fully white. If this is found to be the case, then a conflict has arisen in that the digital value indicates a likelihood that the pixel is to be represented by a binary value of zero but there has been a prior decision to represent the pixel with a binary value of one. A block 486 checks to determine if all pixels in the NEW group have been considered and, if not, the next pixel in the group is selected by a block 488 and control returns to the block 482. If all of the pixels in the group have been considered, then control passes from the block 486 to the block 372 of FIG. 17E or the block 398 of FIG. 17F.

If the block 484 determines that the digital value of the pixel at the coordinates iTEMP1, jTEMP is not less than dvWHITE, then this fail-safe test has been passed and control proceeds to a block 490 which checks to determine if the pixel at the coordinates iTEMP1, jTEMP is already an edge pixel in the edge database. If it is not, a block 493 indicates that such pixel is an edge pixel in the edge database having a binary value equal to one, with the value of the variable EDGETYPE equal to TYPE and a value of a variable EDGEDEG equal to DEG. Control then returns to the block 486.

If the block 490 determines that the pixel at the coordinates iTEMP1, jTEMP is already an edge pixel in the edge database, a block 492 checks to determine whether the value of EDGETYPE for such pixel is equal to the value TYPE. If not, control returns to the block 486 for consideration of other pixels in the group. Otherwise, a block 494 checks to determine whether the value of EDGEDEG for the pixel at the coordinates iTEMP1, jTEMP is greater than or equal to the value of DEG. If not, control passes to the block 492; otherwise, control passes to a block 496 which checks to determine whether the binary value of the pixel at the coordinates iTEMP1, jTEMP is equal to zero as stored in the edge database. If not, control returns to the block 486 for consideration of other pixels in the NEW group. If the answer to the query posed by the block 496 is yes, a conflict has arisen in that the pixel under consideration has already been indicated as having a binary value of zero in the edge database when a subsequent decision has been made to set the binary value of such pixel equal to one. As a result, control exits the programming of FIG. 21 and returns to the block 372 of FIG. 17E or the block 398 of FIG. 17F.

FIG. 22 illustrates the programming executed by the block 384 of FIG. 17F or the block 406 of FIG. 17G to set the binary values associated with the pixels in the NEW group to zero. The programming is analogous to that disclosed with respect to FIG. 21 above. Blocks 500, 502, 506, 508, 510, 513, 514 of FIG. 22 are the same as blocks 480, 482, 486, 488, 490, 493 and 494, respectively, of FIG. 21. As noted more specifically hereinafter, a block 512 is identical to the block 492 except that the binary value of the pixel at coordinates iTEMP1, jTEMP is set equal to zero rather than to one. Also, a block 516 is identical to the block 496 of FIG. 21, except that the block 516 checks to determine whether the binary value of the pixel at the coordinates iTEMP1, jTEMP is equal to one in the edge database, rather than zero.

A block 504 follows the block 502 and checks to determine whether the digital value of the pixel at the coordinates iTEMP1, jTEMP is greater than a value dvBLACK which, in the preferred embodiment, is equal to a value of 192 representing an almost black condition for the pixel of the image file. Similar to the programming of FIG. 21, if the answer to the query posed by the block 504 is affirmative, then a conflict has arisen inasmuch as a determination has been made to assign a binary value of zero to a pixel which is almost fully black in the image file. Accordingly, the blocks 510–516 of FIG. 22 are skipped and consideration is then given to the next pixel in the group.

On the other hand, if the digital value of the pixel at the coordinates iTEMP1, jTEMP is not greater than dvBLACK, control passes to a block 517 which checks to determine if the variable TYPE is equal to the horizontal value. If so, a block 518 checks to determine whether the digital values of the pixels at the coordinates iTEMP1–1, jTEMP and iTEMP1+1, jTEMP are both greater than a threshold value THRESH. If so, then control passes to the block. 506. Otherwise, control passes to the block 510. If the block 517 determines that the variable TYPE is not equal to the horizontal value, a block 519 checks to determine whether the digital values of the pixels at the coordinates iTEMP1, jTEMP–1 and iTEMP1, jTEMP+1 are both greater than THRESH. If so, control passes to the block 506. Otherwise, control passes to the block 510.

The block 510 determines whether the pixel iTEMP1, jTEMP is already in the edge database. If not, the block 512 creates an indication of such pixel as an edge pixel in the edge database having a binary value of zero, a value for EDGETYPE equal to TYPE and a value for EDGEDEG equal to DEG. Control then returns to the block 506 for consideration of further pixels in the group.

Control also passes to the block 512 if the answer to the query posed by either block 513 or 514 is negative.

If the block 514 determines that the value of EDGEDEG for the pixel iTEMP1, jTEMP is greater than or equal to DEG, the block 516 checks to determine whether the binary value of the pixel at the coordinates iTEMP1, jTEMP is equal to one in the edge database. If this is found to be the case, then a conflict has been detected inasmuch as the edge database indicates that the pixel should have an on value while a determination has been made to give the pixel an off value. Accordingly, no attempt is made to change the edge database with regard to this pixel.

Figure 23B:
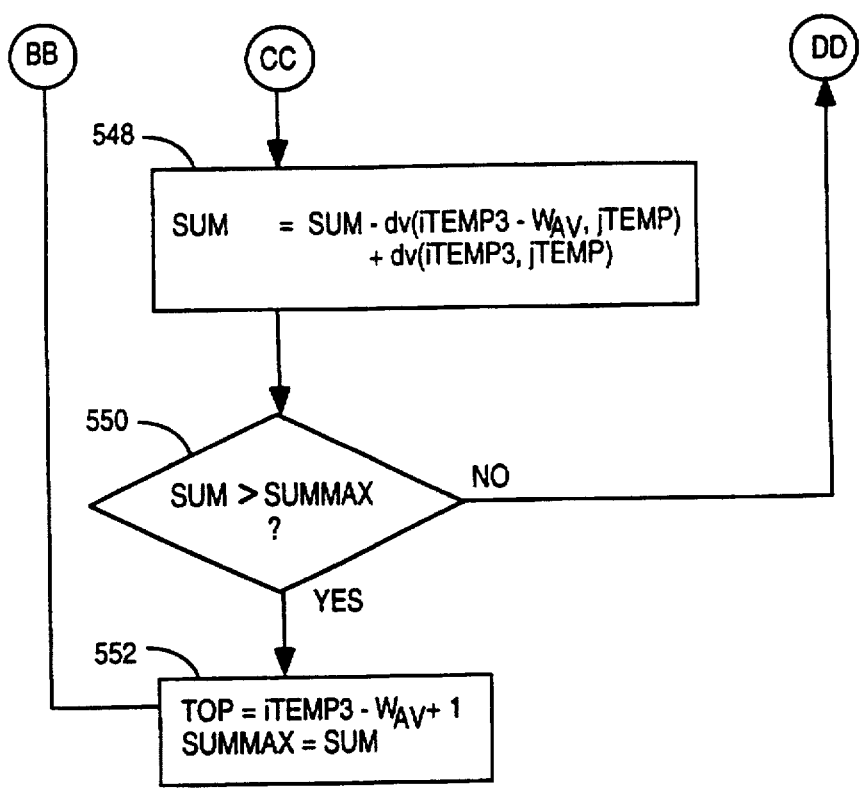

FIGS. 23A and 23B illustrate the programming of the block 316 of FIG. 17B in greater detail. Referring first to FIG. 23A, a block 520 sets the value of the variable jTEMP equal to the horizontal coordinate of the middle pixel in the MCE group. In addition, a variable iTEMP3 and a variable TOP are set equal to the vertical coordinate of the middle pixel in the MCE group and a variable iEND TEMP is set equal to the value of the variable iEND associated with the middle pixel in the MCE group. As noted previously, this association is effected by the block 287 of FIG. 16. Thereafter, a block 522 sets the value of the variable SUM equal to zero and a block 524 sets a variable K3 equal to the value of the variable iTEMP3.

Following the block 524, a block 526 checks to determine whether the value of the variable K3 is greater than zero. If so, a block 528 checks to determine whether the digital value of the pixel at the coordinates K3, jTEMP minus the digital value of the pixel at the coordinates K3–1, jTEMP is less than the value of the variable dvDELTA. If this is found not to be the case, a block 530 decrements the value of K3 by one and control returns to the block 526. On the other hand, if the answer to the query posed by the block 528 is affirmative, or if the block 526 determines that the value of variable K3 is not greater than zero, control passes to a block 532 which sets the value of the variable iTEMP3 equal to K3.

Following the block 532, a block 534 sets the value of the variable K3 equal to iTEMP3 plus $W_{AV}$. A block 536 thereafter checks to determine whether iTEMP3 is less than K3. If this is true, a block 538 augments the value of SUM by the digital value of the pixel at the coordinates iTEMP3, jTEMP and a block 540 increments the value of iTEMP3 by one. Control then returns to the block 536. If the block 536 determines that the value of iTEMP3 is not less than K3, a variable SUMMAX is set equal to the current value of the variable SUM by a block 542. A block 544 then checks to determine whether the value of iTEMP3 is less than the value of iEND TEMP. If not, the value of the variable iTOP is set equal to the value TOP by a block 546. Control then returns to the block 318 of FIG. 17B.

If the block 544 determines that the value of the variable iTEMP3 is less than the value of iEND TEMP, a block 548, FIG. 23B, sets the value of SUM equal to its previous value less the digital value of the pixel at the coordinates iTEMP3–$W_{AV}$, jTEMP plus the digital value of the pixel at the coordinates iTEMP3, JTEMP. A block 550 then checks to determine whether SUM is greater than SUMMAX. If this is not the case, control returns to the block 546 of FIG. 23A. On the other hand, if the value of SUM is greater than the value of SUMMAX, a block 552 sets the value of TOP equal to iTEMP3–$W_{AV}$+1 and the value of SUMMAX is set equal to the value of SUM. Control then returns to the block 544 of FIG. 23A.

In the event a conflict is detected by the block 516 or once all of the pixels in the group have been considered as detected by the block 506, control returns to the block 386 of FIG. 17F or to the block 146 of FIG. 10C.

While specific values have been given to several of the variables used in the programming illustrated in the FIGS., it should be noted that other values may be substituted therefor. In addition, some or all of the programming can be modified to undertake a different methodology for detecting and/or smoothing edges in the reproduction, if desired. Also, the thresholding for non-edge pixels may be replaced by a different methodology for determining binary values for these pixels, if desired. For example, pixels in the neighborhood of each non-edge pixel could be analyzed as part of an algorithm to obtain binary values for such non-edge pixels.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A method of reducing aliasing effects in a reproduction of an original image wherein the reproduction is divided into a two-dimensional array of pixels and each pixel has a sampled value associated therewith representing any of a plurality of grayscale levels at an associated portion thereof, the sampled values being stored in a memory, the method comprising the steps of:

programming a general purpose computer to access the memory and execute the program steps of:

finding a first set of pixels extending in a first direction in the reproduction and satisfying a first condition indicating that an edge has been found;

defining a number of second sets of pixels in the reproduction wherein each second set includes a pixel adjacent to a pixel of the first set and at least one additional pixel and wherein the pixels of each second set extend along a line transverse to the first direction;

analyzing the first set of pixels and the pixels of the second sets of pixels to determine whether a second condition is met indicating that a stroke has been found;

if the second condition is met identifying a third set of pixels extending in the first direction in the reproduction from the first set of pixels and from sampled values associated with the second set of pixels; an reducing the number of grayscale levels by modifying the sampled values for pixels of the third set toward a first value and modifying the sampled values for pixels adjacent pixels of the third set toward a second value.

2. The method of claim 1, wherein the step of finding includes the step of detecting where a threshold number of contiguous pixels extending in the first direction satisfy the edge condition.

3. The method of claim 2, wherein the step of detecting comprises the steps of comparing the sampled values of an initial pixel pair including a first pixel and a second pixel adjacent thereto extending in the second direction to determine if a first edge criterion is met, comparing the sampled values of pixels of further pixel pairs extending in the second direction if the first edge criterion is met to determine the number of further pixel pairs that satisfy a second edge criterion and concluding that an edge has been found if the number of further pixel pairs that satisfy the second edge criterion exceeds a certain value.

4. The method of claim 1, wherein the step of finding includes the step of determining the dimension of a stroke in the second direction from the first set of pixels and other pixels associated therewith.

5. The method of claim 4, wherein the step of identifying comprises the step of choosing the second set of pixels in dependence upon the first set of pixels and the determined stroke dimension.

6. The method of claim 4, wherein the step of determining includes the steps of finding the dimension of a stroke portion associated with each pixel of the first set and deriving the dimension of the stroke from the dimensions of the stroke portions.

7. The method of claim 6, wherein the step of deriving includes the step of finding the most common stroke portion dimension associated with the pixels of the first set and assigning the most common stroke portion dimension as the stroke dimension.

8. The method of claim 6, wherein each sampled value has a magnitude in a range between first and second limits and wherein the step of finding the dimension of each stroke portion includes the steps of summing the sampled values of pixels lying in the stroke portion together to obtain a sum and dividing the sum by one of the limits.

9. The method of claim 4, wherein the second set of pixels lie on a line and wherein the dimension of the stroke is expressed as a variable W equal to a number of pixels and the step of identifying includes the steps of selecting one of the pixels of the first set, selecting a certain set of W contiguous pixels within the stroke portion associated with the selected pixel in accordance with a selection criterion and establishing the line coincident with a pixel of the certain set.

10. The method of claim 9, wherein the step of selecting the certain set of W contiguous pixels includes the steps of choosing successive sets of W contiguous pixels in the stroke portion and summing together the sampled values associated with the pixels of each set to obtain a succession of sums of sampled values and finding the W contiguous pixels in the stroke portion having the greatest sum of sampled values.

11. A method of modifying an image having a plurality of pixels each of which has a sampled value stored in a memory associated therewith, and wherein each sampled value can assume a scale level the method comprising the steps of:

programming a general purpose computer to access the memory and execute the program steps of finding pixels in the image satisfying an edge condition and extending in a first direction;

determining from the found pixels the overall dimension of a stroke in a second direction transverse to the first direction;

identifying a set of contiguous pixels defining a first line extending in the first direction in dependence upon the found pixels and the determined stroke dimension; and reducing the number of grayscale levels by modifying the sampled values for the pixels in the identified set toward a first value and modifying the sampled values for pixels defining a second line adjacent the first line toward a second value.

12. The method of claim 11, wherein the step of finding includes the step of detecting where a threshold number of contiguous pixels extending in the first direction satisfy the edge condition.

13. The method of claim 11, wherein the step of determining includes the step of finding a stroke run length associated with each found pixel and defining a stroke width based upon the stroke run lengths.

14. The method of claim 11, wherein the step of identifying includes the steps of selecting one of the found pixels, locating a second set of pixels associated with the selected pixel wherein the second set of pixels satisfies a selection criterion and extends in a second direction perpendicular to the first direction and establishing the first line coincident with a first pixel of the second set.

15. The method of claim 11, wherein the step of modifying the sampled values for pixels in the identified set comprises the step of setting such sampled values equal to a first binary number.

16. The method of claim 15, wherein the step of modifying the sampled values for pixels defining the second line comprises the step of setting such sampled values equal to a second binary number.

17. A method of developing a halftone reproduction of an original image having a plurality of pixels each of which has a sampled value associated therewith wherein the sampled values are in a range between first and second limits, the method comprising the steps of:

finding a first set of pixels extending in a first direction in the image and satisfying an edge condition;

identifying a second set of pixels also extending in the first direction in the image and which, together with the first set of pixels, define a stroke;

associating with each pixel of the first set a pixel of the second set wherein associated pixels of the first and second sets are displaced from one another along a second direction perpendicular to the first direction;

for each pixel of the first set adding the sampled value thereof to the sampled value of the pixel of the second set associated therewith and the sampled values of all pixels located therebetween to obtain a plurality of sums;

dividing each sum by one of the first and second limits to obtain a plurality of stroke run lengths each associated with one of the pixels of the first set;

finding the most common stroke run length and the pixels of the first set associated with the most common run length;

defining first and second lines extending in the first direction based upon the pixels of the first set associated with the most common stroke run length;

converting pixels lying on the first and second lines to a first binary value;

converting pixels on third and fourth lines adjacent to the first and second lines, respectively, to a second binary value; and using the binary values of the converted pixels to control a halftone reproduction device.

18. The method of claim 17, wherein the step of finding the first set of pixels includes the step of detecting where a threshold number of contiguous pixels extending along the first direction satisfy the edge condition.

19. The method of claim 17, wherein the step of defining comprises the step of selecting one of the pixels of the first set, locating a further set of pixels associated with the selected pixel wherein the further set of pixels satisfy a selection criterion and extend in the second direction and establishing the first line coincident with a first pixel of the further set.

20. The method of claim 19, wherein the step of defining includes the further step of establishing the second line coincident with the pixel of the further set farthest from the first pixel of the further set.

21. A system for reducing aliasing effects in a reproduction of an original image wherein the reproduction is divided into a two-dimensional array of pixels and wherein each pixel has a sampled value associated therewith representing any of a plurality of grayscale levels at an associated portion thereof, comprising:

a computer-readable memory for storing programming to implement means for finding a first set of pixels extending along a first direction in the reproduction and satisfying an edge condition;

means for defining a number of second sets of pixels in the reproduction wherein each second set includes a pixel adjacent to a pixel of the first set and at least one additional pixel and wherein the pixels of each second set extend along a line transverse to the first direction;

means for analyzing the first set of pixels and the pixels of the second sets of pixels to determine whether a second condition is met indicating that a stroke has been found;

means coupled to the finding means for identifying a third set of pixels extending in the first direction in the reproduction from the first set of pixels and from sampled values associated with the second set of pixels; and means coupled to the identifying means for reducing the number of grayscale levels by modifying the sampled values for pixels of the third set toward a first value and by modifying the sampled values for pixels adjacent pixels of the third set toward a second value.

22. The system of claim 21, wherein the finding means includes means for detecting where a threshold number of contiguous pixels extending in the first direction satisfy the edge condition.

23. The system of claim 22, wherein the detecting means comprises first means for comparing the sampled values of an initial pixel pair including a first pixel and a second pixel adjacent thereto extending in the second direction to determine if a first edge criterion is met and second means for comparing the sampled values of pixels of further pixel pairs extending in the second direction if the first edge criterion is met to determine the number of further pixel pairs that satisfy a second edge criterion and means for determining if the number of further pixel pairs that satisfy the second edge criterion exceeds a certain value.

24. The system of claim 21, wherein the finding means includes means for determining the dimension of a stroke in the second direction from the first set of pixels and other pixels associated therewith.

25. The system of claim 24, wherein the second set of pixels lie on a line and wherein the identifying means further includes means for selecting contiguous pixels defining the line as the third set of pixels in dependence upon the first set of pixels and the determined stroke dimension.

26. The system of claim 25, wherein the determining means includes means for obtaining the dimension of a stroke portion associated with each pixel of the first set and means for deriving the dimension of the stroke from the dimensions of the stroke portions.

27. The system of claim 26, wherein the deriving means includes means for ascertaining the most common stroke portion dimension associated with the pixels of the first set and means for assigning the most common stroke portion dimension as the stroke dimension.

28. The system of claim 26, wherein each sampled value has a magnitude in a range between first and second limits and wherein the obtaining means includes means for summing the sampled values of pixels lying in the stroke portion together to obtain a sum and means for dividing the sum by one of the limits.

29. The system of claim 24, wherein the second set of pixels lie on a line and wherein the dimension of the stroke is expressed as a variable W equal to a number of pixels and wherein the identifying means includes first means for selecting one of the pixels of the first set, second means for selecting a certain set of W contiguous pixels within the stroke portion associated with the selected pixel in accordance with a selection criterion and means for establishing the line coincident with a particular pixel of the certain set.

30. The system of claim 29, wherein the second selecting means includes means for choosing successive sets of W contiguous pixels in the stroke portion means for summing together the sampled values associated with the pixels of each set to obtain a succession of sums of sampled values and second means for finding the W contiguous pixels in the stroke portion having the greatest sum of sampled values.

31. A system for creating a halftone reproduction of an image having a plurality of pixels each of which has a grayscale sampled value associated therewith, comprising:

means for finding a first set of pixels in the image extending in a first direction and satisfying an edge condition;

means coupled to the finding means for determining from the first set of pixels the overall dimension of a stroke in a second direction transverse to the first direction;

means coupled to the finding means and the determining means for identifying a set of contiguous pixels defining a first line extending in the first direction in dependence upon the pixels of the first set and the determined stroke dimension;

means coupled to the identifying means for setting the sampled values for the pixels in the identified set equal to a first halftone value and for setting the sampled values for pixels defining a second line adjacent the first line equal to a second halftone value; and a halftone reproduction device coupled to the setting means for creating the halftone reproduction.

32. The system of claim 31, wherein the finding means, the determining means, the identifying means and the modifying means are implemented by a programmed computer.

33. The system of claim 31, wherein the modifying means comprises means for setting the sampled values for the pixels in the identified set equal to a first binary value and the sampled values for pixels defining a second line adjacent the first line equal to a second binary value.

34. The system of claim 31, wherein the second direction is perpendicular to the first direction and wherein the determining means comprises means for ascertaining stroke width along the second direction.

35. The system of claim 31, wherein the dimension of the stroke is expressed as a variable W equal to a number of pixels and wherein the identifying means includes first means for selecting one of the pixels of the first set, second means for selecting a certain set of W contiguous pixels within a stroke portion associated with the selected pixel in accordance with a selection criterion and means for establishing the first line coincident with one of the pixels of the certain set.

36. The system of claim 35, wherein the second selecting means includes means for choosing successive sets of W contiguous pixels in the stroke portion, means for summing together the sampled values associated with the pixels of each set to obtain a succession of sums of sampled values and second means for finding the W contiguous pixels in the stroke portion having the greatest sum of sampled values.

* * * * *